(12) United States Patent
Tasaki et al.

(10) Patent No.: US 11,548,387 B2
(45) Date of Patent: Jan. 10, 2023

(54) INFORMATION PROCESSING DEVICE, INFORMATION PROCESSING METHOD, COMPUTER PROGRAM PRODUCT, AND MOVING OBJECT

(71) Applicant: Kabushiki Kaisha Toshiba, Minato-ku (JP)

(72) Inventors: Tsuyoshi Tasaki, Yokohama (JP); Yuma Sano, Setagaya (JP); Rie Katsuki, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 73 days.

(21) Appl. No.: 15/663,907

(22) Filed: Jul. 31, 2017

(65) Prior Publication Data
US 2018/0251029 A1 Sep. 6, 2018

(30) Foreign Application Priority Data
Mar. 1, 2017 (JP) .............................. JP2017-038731

(51) Int. Cl.
*B60K 31/00* (2006.01)
*G08G 1/16* (2006.01)
(Continued)

(52) U.S. Cl.
CPC ..... *B60K 31/0008* (2013.01); *G08G 1/09626* (2013.01); *G08G 1/165* (2013.01);
(Continued)

(58) Field of Classification Search
CPC ........ B60K 31/0008; B60K 2031/0016; G08G 1/09626; G08G 1/165; G08G 1/166;
(Continued)

(56) References Cited

U.S. PATENT DOCUMENTS 4,914,605 A * 4/1990 Loughmiller, Jr. .......................... G01C 21/3673 340/995.1
6,128,018 A * 10/2000 Nakajima ............... G06T 17/00 345/419

(Continued)

FOREIGN PATENT DOCUMENTS

| JP | 09-225143 | 9/1997 |
|---|---|---|
| JP | 10-149096 | 6/1998 |

(Continued)

OTHER PUBLICATIONS

English Translation of WO 2007/119336 (Year: 2007).*
English translation of JP 2004171269 (Year: 2004).*
English translation of JP 2012194866 (Year: 2012).*

*Primary Examiner* — Thomas E Worden
(74) *Attorney, Agent, or Firm* — Oblon, McClelland, Maier & Neustadt, L.L.P.

(57) ABSTRACT

According to an embodiment, an information processing device includes a memory and processing circuitry. The processing circuitry is configured to acquire a map defining a target in a coordinate space in which a direction along a traveling direction of a moving object is one of coordinate axes, and approximate a movement route of the moving object with a specified shape area along a coordinate axis in the coordinate space, the specified shape area being a basic unit of collision determination.

18 Claims, 12 Drawing Sheets

(51) Int. Cl.
  *G08G 1/0962* (2006.01)
  *G06T 3/60* (2006.01)
  *G08G 5/04* (2006.01)
(52) U.S. Cl.
  CPC ...... *G08G 1/166* (2013.01); *B60K 2031/0016* (2013.01); *B60Y 2300/095* (2013.01); *B60Y 2300/26* (2013.01); *G06T 3/60* (2013.01); *G08G 5/045* (2013.01)
(58) Field of Classification Search
  CPC ...... G08G 1/16; G08G 5/04; B60Y 2300/095; B60Y 2300/26; G06T 3/60; B60R 21/0134
  See application file for complete search history.

(56) References Cited

U.S. PATENT DOCUMENTS

| | | | | |
|---|---|---|---|---|
| 6,324,471 | B1 * | 11/2001 | Katayama | G08G 1/0969 701/410 |
| 9,116,003 | B2 * | 8/2015 | Khorashadi | G01C 21/20 |
| 9,140,559 | B2 * | 9/2015 | Khorashadi | G01C 21/20 |
| 2005/0102097 | A1 * | 5/2005 | Tanizaki | G01C 21/3667 701/411 |
| 2011/0313655 | A1 * | 12/2011 | Litvack | G01C 21/20 701/426 |
| 2012/0271540 | A1 * | 10/2012 | Miksa | G01C 21/30 701/409 |
| 2012/0323479 | A1 * | 12/2012 | Nagata | G08G 1/167 701/301 |
| 2013/0204516 | A1 * | 8/2013 | Fukamachi | G08G 1/166 701/300 |
| 2013/0218467 | A1 * | 8/2013 | Ogawa | G01C 21/3407 701/533 |
| 2013/0261850 | A1 * | 10/2013 | Smith | G01C 23/005 701/3 |
| 2014/0180569 | A1 * | 6/2014 | Ueda | B62D 15/025 701/400 |
| 2014/0288815 | A1 * | 9/2014 | Bousquet | G08G 5/0078 701/301 |
| 2014/0354668 | A1 * | 12/2014 | Seo | G09B 29/007 345/581 |
| 2015/0175166 | A1 * | 6/2015 | Saki | B60W 30/16 702/157 |
| 2016/0086490 | A1 * | 3/2016 | Ando | B60W 30/09 701/301 |
| 2016/0284218 | A1 * | 9/2016 | Ejiri | G08G 1/166 |
| 2017/0017236 | A1 * | 1/2017 | Song | G08G 1/164 |
| 2017/0061796 | A1 * | 3/2017 | Osagawa | G05D 1/0289 |
| 2017/0132930 | A1 * | 5/2017 | Ando | G08G 1/09626 |
| 2017/0137025 | A1 * | 5/2017 | Muto | B60W 30/18154 |
| 2017/0329328 | A1 * | 11/2017 | Horita | G05D 1/0061 |
| 2018/0144637 | A1 * | 5/2018 | Ikedo | G08G 1/04 |
| 2018/0174464 | A1 * | 6/2018 | Ikedo | G08G 1/166 |
| 2019/0156540 | A1 * | 5/2019 | Hiramoto | G06T 11/60 |

FOREIGN PATENT DOCUMENTS

| | | | | |
|---|---|---|---|---|
| JP | 3138423 | | 2/2001 | |
| JP | 2004171269 | A * | 6/2004 | |
| JP | 2006-154967 | A | 6/2006 | |
| JP | 2012194866 | A * | 10/2012 | |
| JP | 2014-224833 | | 12/2014 | |
| JP | 2015-191650 | | 11/2015 | |
| JP | 2016-136378 | A | 7/2016 | |
| WO | WO-2007119336 | A1 * | 10/2007 | ............ G08G 1/166 |
| WO | WO-2008005661 | A2 * | 1/2008 | ............ G06N 3/008 |
| WO | WO-2017050358 | A1 * | 3/2017 | ........... G05D 1/0214 |

\* cited by examiner

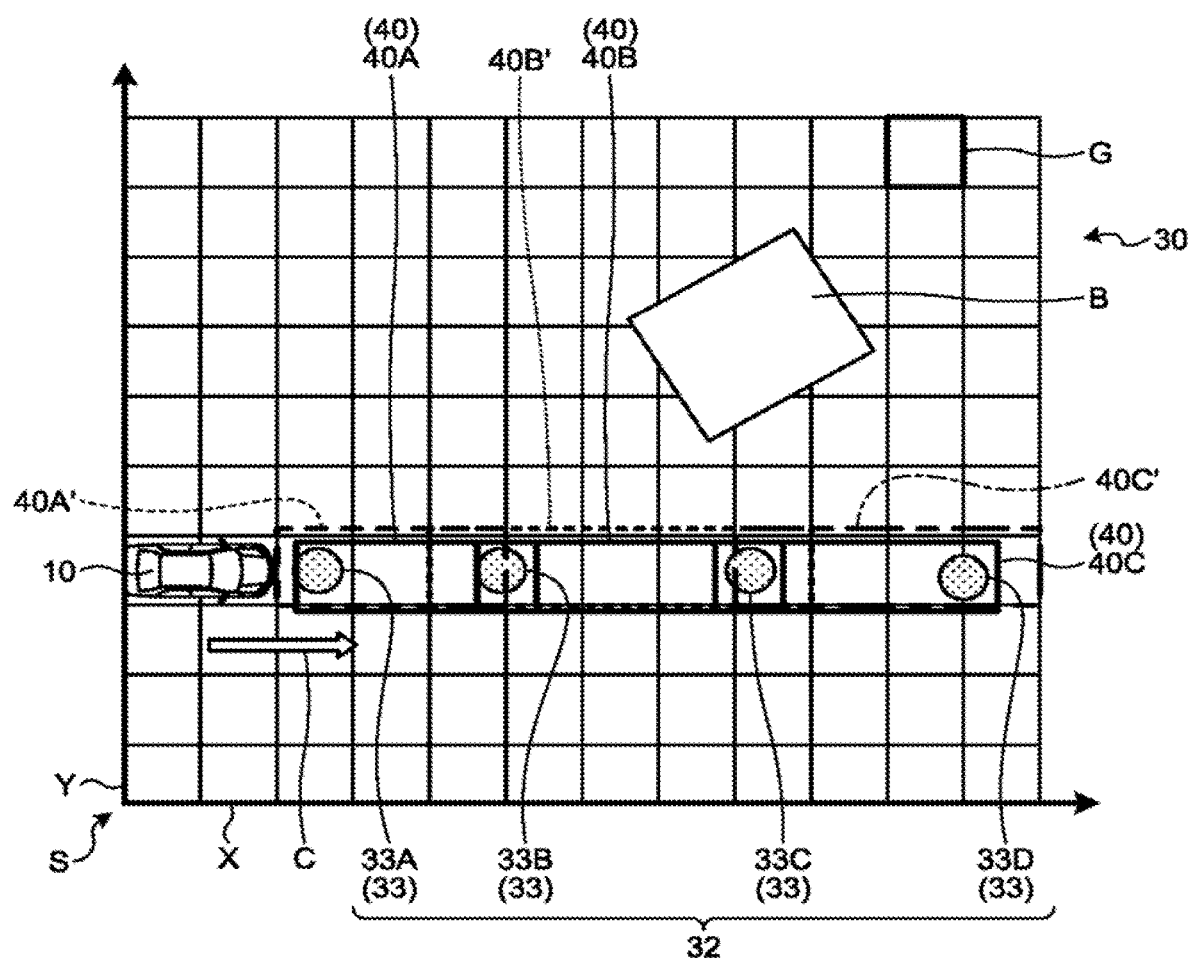

INFORMATION PROCESSING DEVICE, INFORMATION PROCESSING METHOD, COMPUTER PROGRAM PRODUCT, AND MOVING OBJECT

CROSS-REFERENCE TO RELATED APPLICATIONS

This application is based upon and claims the benefit of priority from Japanese Patent Application No. 2017-038731, filed on Mar. 1, 2017; the entire contents of which are incorporated herein by reference.

FIELD

Embodiments described herein relate generally to an information processing device, an information processing method, a computer program product, and a moving object.

BACKGROUND

A device which performs collision determination has been known. For example, a determination area in which an obstacle present in a space is approximated with a rectangular parallelepiped boy is set. In addition, a system, which determines collision when a position of a moving object moving in the space belongs to the determination area, has been disclosed. In addition, a method of setting a determination area by approximating one obstacle with a shape obtained by combining a plurality of rectangular parallelepiped bodies has been disclosed, from the viewpoint of improving determination accuracy.

In the conventional method, however, it is necessary to set the determination area for all obstacles present in the space, and the determination accuracy decreases in the case of maintaining high speed as the obstacle has a more complicated and the number of obstacles increases. That is, conventionally, it is difficult to perform collision determination at high speed and with high accuracy.

BRIEF DESCRIPTION OF THE DRAWINGS

FIG. 5B is an explanatory diagram of the specified shape area;

DETAILED DESCRIPTION

According to an embodiment, an information processing device includes a memory and processing circuitry. The processing circuitry is configured to acquire a map defining a target in a coordinate space in which a direction along a traveling direction of a moving object is one of coordinate axes, and approximate a movement route of the moving object with a specified shape area along a coordinate axis in the coordinate space, the specified shape area being a basic unit of collision determination.

Hereinafter, an information processing device, an information processing method, an information processing program, and a moving object will be described in detail with reference to the accompanying drawings.

Figure 1:
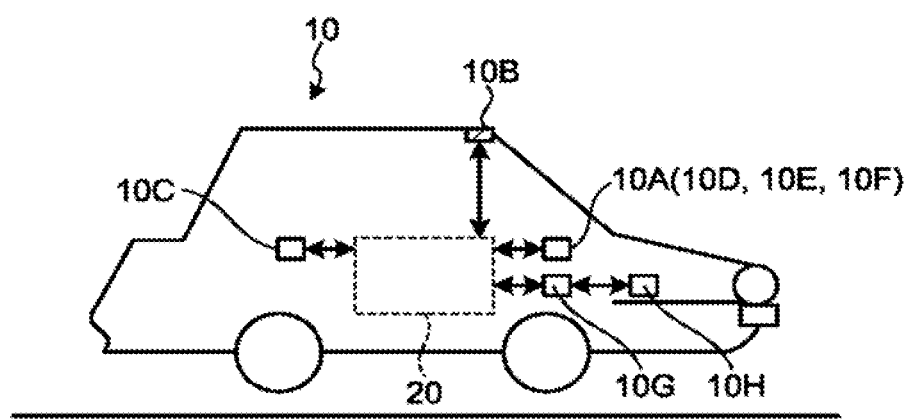
FIG. 1 is a diagram illustrating an example of a moving object.

FIG. 1 is a diagram illustrating an example of a moving object 10 according to an embodiment.

The moving object 10 includes an information processing device 20, an output unit 10A, an external sensor 10B, an internal sensor 10C a power controller 10G, and a power unit 10H.

The information processing device 20 is, for example, a dedicated or general-purpose computer. In the present embodiment, a case where the information processing device 20 is mounted on the moving object 10 will be described as an example.

The moving object 10 is a movable object. The moving object 10 is, for example, a vehicle, a bogie, an object capable of flying (manned airplane, unmanned airplane (for example, an unmanned aerial vehicle (UAV), and a drone)), a robot, and the like. In addition, the moving object 10 is, for example, a moving object traveling via a driving operation by a person or a moving object capable of automatically traveling (autonomously traveling) without the driving operation by the person. In the present embodiment, a case where the moving object 10 is the vehicle will be described as an example. The vehicle is, for example, a two-wheeled automobile, a three-wheeled automobile, a four-wheeled automobile, or the like. In the present embodiment, a case where the vehicle is a four-wheeled automobile capable of autonomously traveling will be described as an example.

The information processing device 20 is not limited to the mode of being mounted on the moving object 10. The information processing device 20 may be mounted on a stationary object. The stationary object is an object fixed to the ground. The stationary object is an object that is immovable or an object in the state of being stationary with respect to the ground. The stationary object is, for example, a guardrail, a pole a parked vehicle, a road sign, and the like. In addition, the information processing device 20 may be mounted on a cloud server that executes processing on a cloud.

The power unit 10H is a driving device mounted on the moving object 10. The power unit 10H is, for example, an engine, a motor a wheel, or the like.

The power controller 10G controls the power unit 10H. The power unit 10H is driven by control of the power controller 10G. For example, the power controller 10G controls the power unit 10H based on information obtained from the external sensor 10B and the internal sensor 10C, collision determination result information derived by a process to be described later, and the like in order to automatically operate the moving object 10. The acceleration amount, the brake amount, the steering angle, and the like of the moving object 10 are controlled by control of the power unit 10H. For example the power controller 10G controls the vehicle so as to keep a lane on which the vehicle currently travels avoiding an object such as an obstacle, and keep an inter-vehicle distance with a forward vehicle to be equal to or more than a predetermined distance.

The output unit 10A outputs various kinds of information. In the resent embodiment, the output unit 10A outputs a display screen indicating a specified shape area, which is a basic unit of collision determination, derived by the information processing device 20, collision determination result information, and the like. Details of the specified shape area and the collision determination result information will be described later.

The output unit 10A includes, for example, a communication function to transmit information, a display function to display information, a sound output function to output sound indicating information, and the like. For example, the output unit 10A includes at least one of a communication unit 10D, a display 10E, and a speaker 10F. In the present embodiment, the output unit 10A having the configuration of including the communication unit 10D, the display 10E, and the speaker 10F will be described as an example.

The communication unit 10D transmits information to another device. For example, the communication unit 10D transmits information to another device via a known communication line. The display 10E is an example of a display unit. The display 10E displays information. The display 10E is, for example, a well-known liquid crystal display (LCD), a projection device, a light, or the like. The speaker 10F outputs sound indicating information.

The external sensor 10B is a sensor that recognizes an outside world around the moving object 10. The external sensor 10B may be mounted on the moving object 10 or may be mounted outside the moving object 10. The outside of the moving object 10 indicates, for example, another moving object, an external device, or the like.

The periphery of the moving object 10 is an area within a predetermined range from the moving object 10. This range is an observable range of the external sensor 10B. This range may be set in advance.

The external sensor 10B acquires observation information of the external. The observation information is information indicating an observation result around an installation position of the external sensor 10B.

The external sensor 10B is, for example, an image capturing device, a distance sensor (millimeter wave radar or a laser sensor), a sonar sensor that detects an object using sound waves, an ultrasonic sensor, and the like. The image capturing device obtains captured image data (hereinafter, referred to as a captured image) by capturing. The image capturing device is a stereo camera, a position specifying camera, or the like. The captured image is digital image data defining a pixel value for each pixel, a depth map defining a distance from the external sensor 10B for each pixel, or the like. The laser sensor is, for example, a two-dimensional laser imaging detection and ranging (LIDAR) sensor installed to be parallel to the horizontal plane or a three-dimensional LIDAR sensor.

The internal sensor 10C is a sensor that observes own information of the moving object 10. The internal sensor 10C acquires current position information indicating a current position of the moving object 10, posture information of the moving object 10, traveling direction information indicating a traveling direction of the moving object 10, and velocity, acceleration, angular velocity, and the like of the moving object 10. The internal sensor 10C is, for example, an inertial measurement unit (IMU), a speed sensor, a global positioning system (GPS), or the like. The IMU obtains triaxial acceleration, triaxial angular velocity, and the like of the moving object 10.

An input device 10J is a device that receives input from a user. The input device 10J is, for example a keyboard, a mouse, a touch panel, an instruction button, and the like.

Figure 2:
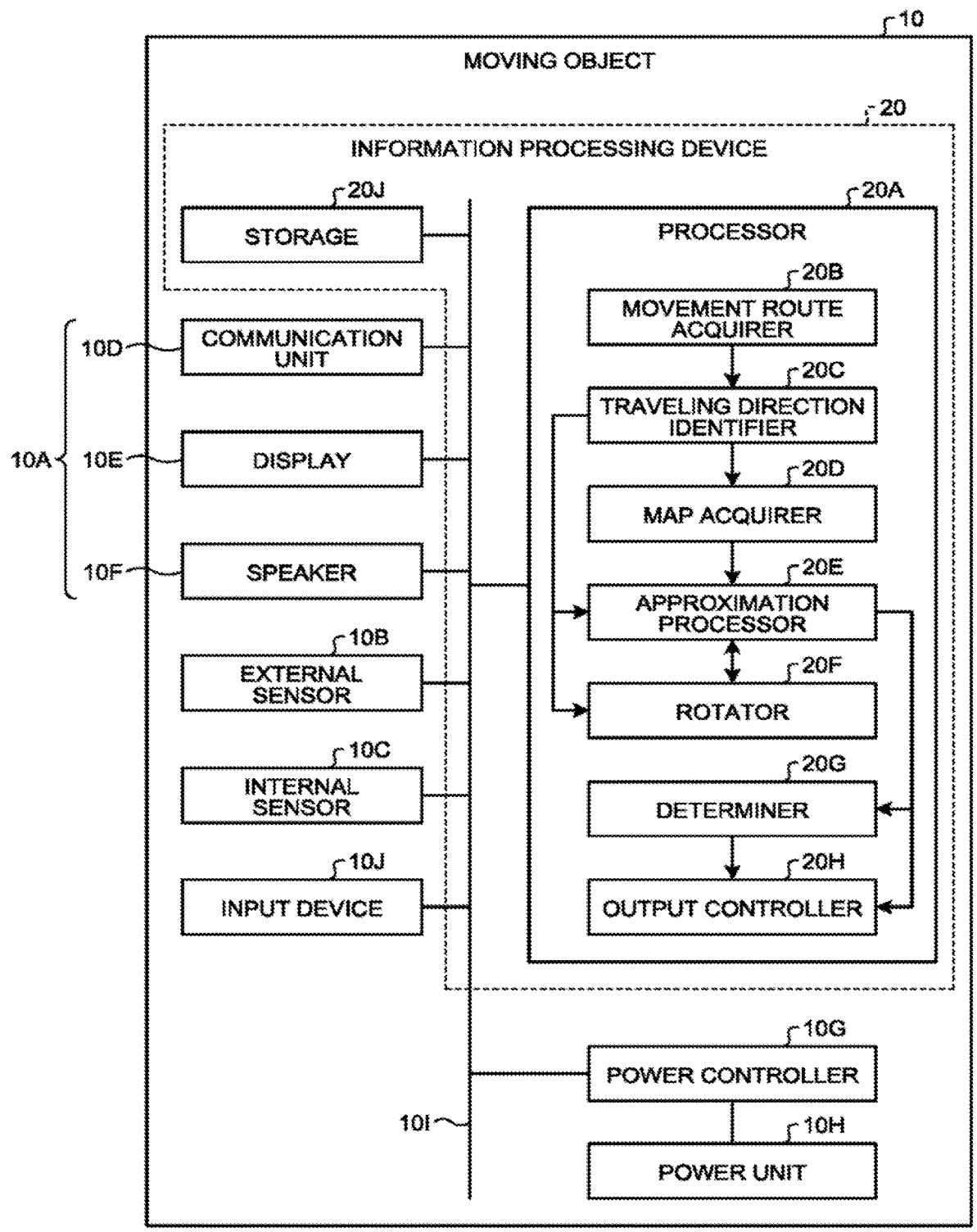
FIG. 2 is a block diagram illustrating an example of a configuration of the moving object.

Next, an electrical configuration of the moving object 10 will be described in detail. FIG. 2 is a block diagram illustrating an example of the configuration of the moving object 10.

The moving object 10 incudes the information processing device 20, the output unit 10A, the external sensor 10B, the internal sensor 10C, the input device 10J, the power controller 10G, and the power unit 10H. As described above, the output unit 10A includes the communication unit 10D, the display 10E, and the speaker 10F.

The information processing device 20, the output unit 10A, the external sensor 10B, the internal sensor 10C, and the power controller 10G are connected via a bus 10I. The power unit 10H is connected to the power controller 10G.

The information processing device 20 performs collision determination or the like on a target of the moving object 10.

The target is an object that is likely to collide with the moving object 10. In other words, the target is an object to be subjected to collision determination by the information processing device 20. Specifically, the target is an obstacle that hinders the travel of the moving object 10. The obstacle is another moving object, a living object such as a person and a tree a non-living object (for example, a sign or a signal) installed on the ground, and the like. The target is not limited to the obstacle. For example, the target may be a non-obstacle. The non-obstacle is an object that does not hinder the travel of the moving object. In the present embodiment, a case where the target is the obstacle will be described as an example.

The information processing device 20 incudes a storage 20J and a processor 20A. That is, the output unit 10A, the external sensor 10B, the internal sensor 10C, the input device 10J, the power controller 10G, the processor 20A, and the storage 20J are connected via the bus 10I.

At least one of the storage 20J, the output unit 10A (the communication unit 10D, the display 10E, and the speaker 10F), the external sensor 10B, the internal sensor 10C, the input device 10J, and the power controller 10G may be connected to the processor 20A in a wired or wireless manner. In addition, at least one of the storage 20J, the output unit 10A (the communication unit 10D, the display 10E, and the speaker 10F), the external sensor 10B, the internal sensor 10C, the input device 10J, and the power controller 10G may be connected to the processor 20A via a network.

The storage 20J stores various kinds of data. The storage 20J is, for example, a random access memory (RAM), a semiconductor memory device such as a flash memory, a hard disk, an optical disk, or the like. The storage 20J may be a storage device provided outside the information processing device 20. In addition, the storage 20J may be a storage medium. Specifically, the storage medium may store or temporarily store a program or various kinds of information downloaded via a local area network (LAN), the Internet, or the like. In addition, the storage 20J may be configured using a plurality of storage media.

The processor 20A incudes a movement route acquirer 20B, a traveling direction identifier 20C, a map acquirer 20D, an approximation processor 20E, a rotator 20F, a determiner 20G, and an output controller 20H. The movement route acquirer 20B, the traveling direction identifier 20C the map acquirer 20D, the approximation processor 20E, the rotator 20F, the determiner 20G, and the output controller 20H are implemented by one or more processors, for example.

For example, the above-described respective units may be implemented by causing a processor such as a central processing unit (CPU) to execute a program, that is, software. The above-described respective units may be implemented by a processor such as a dedicated integrated circuit (IC), that is, hardware. The above-described respective units may be implemented using both the software and the hardware in combination. In the case of using the plurality of processors, each of the processors may implement one among the respective units, or may implement two or more units among the respective units.

The term "processor" used in the present embodiment and embodiments to be described later means, for example, a CPU, an engine controller (ECU), a graphics processing unit (GPU), or an application specific integrated circuit (ASIC), or a circuit of a programmable logic device (for example, a simple programmable logic device (SPLD), a complex programmable logic device (CPLD), and a field programmable gate array (FPGA)).

The processor implements the above-described respective units by reading the program saved in the storage 20J. It may be configured such that the program may be directly incorporated in a circuit of the processor instead of saving the program in the storage 20J. In this case, the processor implements the above-described respective units by reading the program incorporated in the circuit.

The movement route acquirer 20B acquires movement route information indicating a movement route. The movement route is a traveling-scheduled route for the moving object 10. For example, the movement route indicates a route from the current position of the moving object 10 to a destination.

The movement route acquirer 20B acquires the movement route information from the storage 20J or from the external device or the like via the communication unit 10D.

The movement route acquirer 20B may acquire the movement route information by generating the movement route information.

In this case, the movement route acquirer 20B may generate the movement route information using a known method. For example, the movement route acquirer 20B obtains the current position information indicating the current position of the moving object 10 from the internal sensor 10C. In addition, the movement route acquirer 20B obtains information indicating the destination of the moving object 10 from the input device 10J. In addition, the movement route acquirer 20B acquires map information including the current position and the destination indicated by the current position information of the moving object 10 from an external device or the like via the communication unit 10D. Further, the movement route acquirer 20B generates the movement route information indicating a movement route from the current position to the destination on the map indicated by the map information.

The movement route may be represented using any of a line indicating a movement route, a group of a plurality of route points arranged along the movement route, a combination of the line and the route point. In the present embodiment, a case where the movement route is represented using the group of the plurality of route points arranged along the movement route will be described a an example.

The arrangement along the movement route means to be arranged in the order of following the movement route. In the present embodiment, the direction along the movement route (that is, the direction that follows the movement route) is referred to as a route direction in some cases.

An interval between the route points forming the movement route is not limited. For example, it is preferable that the distance between the route points adjacent to each other in the route direction forming the movement route be equal to or smaller than a smallest size of the obstacle determined by the information processing device 20. The smallest size is the smallest size assumed in advance in the information processing device 20 of the obstacle used for collision determination. The smallest size may be the smallest size among the targets included in the map to be described later. Further, the smallest size may be a fixed distance interval that has been simply fixed. The smallest size may be a position interval reaching in a fixed time.

The traveling direction identifier 20C identifies the traveling direction of the moving object 10. The traveling direction is a traveling direction of the moving object 10 when traveling on the movement route. For example, the traveling direction identifier 20C identifies a moving direction of the moving object 10 as the traveling direction of the moving object 10. In this case, the traveling direction identifier 20C identifies the traveling direction of the moving object 10 using a change of the acceleration, the angular velocity, the current position information, and the like of the moving object 10 observed by the internal sensor 10C.

The traveling direction identifier 20C may identify a moving direction from an upstream side toward a downstream side in the movement direction of the moving object 10 as the traveling direction of the moving object 10. Specifically, when the moving object 10 is moving forward, a direction from a rear glass side toward a front glass side of the moving object 10 is identified as the traveling direction of the moving object 10. In addition, for example, when the moving object 10 is moving backward (backward movement), a direction from the front glass side of the moving object 10 toward the rear glass side is identified as the traveling direction of the moving object 10.

In addition, the traveling direction identifier 20C may identify the traveling direction of the moving object 10 by using the movement route.

In this case, for example, the traveling direction identifier 20C identifies a point corresponding to the current position of the moving object 10 in the movement route. In addition, the traveling direction identifier 20C identifies a route point which is on the downstream side in the moving direction of the moving object 10 and closest to the current position. Further, the traveling direction identifier 20C may identify a direction toward a side away from the moving object 10 along a straight line passing through the current position of the moving object 10 and the corresponding route point, as the traveling direction.

In addition, for example, the traveling direction identifier 20C may identify the traveling direction of the moving object 10 using a plurality of route points. In this case, the traveling direction identifier 20C identifies the current position of the moving object 10 in the movement route. In addition, the traveling direction identifier 20C identifies the plurality of route points which are positioned on the downstream side in the movement direction of the moving object 10 and within a predetermined range from the current position. Further, the traveling direction identifier 20C may identify the direction toward the side away from the moving object 10 along a straight line approximating to the straight line passing through the current position of the moving object 10 and the route point which is positioned on the downstream side in the movement direction of the moving object 10, as the traveling direction.

Figure 3:
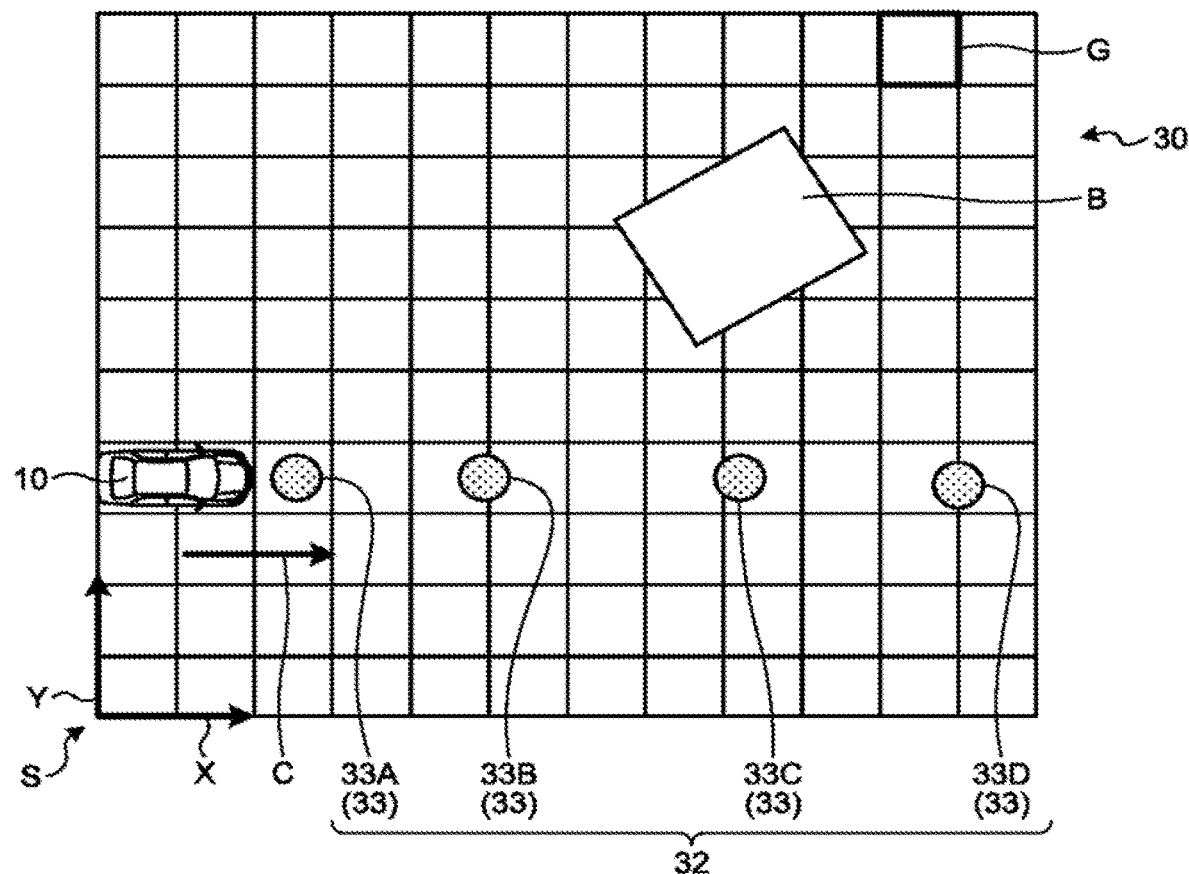
FIG. 3 is a schematic diagram illustrating an example of a map.

Next, the map acquirer 20D will be described. The map acquirer 20D acquires the map. FIG. 3 is a schematic diagram illustrating an example of a map 30.

The map 30 is a map in which a target (an obstacle B in the present embodiment) is defined in a coordinate space S having a direction along a traveling direction C of the moving object 10 as one of coordinate axes. In addition, a movement route 32 is arranged in the map 30.

The coordinate space S is a two-dimensional or three-dimensional Cartesian space. The Cartesian space is referred to as an orthogonal coordinate system in some cases. In the present embodiment, a case where the coordinate space S is the two-dimensional Cartesian space will be described as an example. Thus, a case where the coordinate space S is a space represented by two mutually orthogonal coordinate axes (for example, an X axis and a Y axis) will be described in the present embodiment.

The coordinate axis of the coordinate space S of the map 30 is set along the traveling direction C of the moving object 10. Specifically, one coordinate axis (that is, the X axis or the Y axis) among a plurality of coordinate axes forming the coordinate space S of the map 30 is set as a direction along the traveling direction C.

Specifically, the direction along the traveling direct C of the moving object 10 is a direction within an angular range of ±22.5° (in total 45°) with respect to the traveling direction C of the moving object 10. The direction along the traveling direction C of the moving object 10 is preferably a direction within an angular range of ±10°, and particularly preferably a direction that matches the traveling direction C. When the traveling direction C and the direction along the traveling direction C match each other, the traveling direction C and the coordinate axis of the coordinate space S are in the state of being completely parallel to each other.

In the present embodiment, as an example, a case where the direction along the traveling direction C of the moving object 10 is parallel to one coordinate axis of the coordinate space S will be described as an example. In the example illustrated in FIG. 3, the traveling direction C is parallel to the X axis in the coordinate space S.

In addition, the obstacle B is defined in the map 30. In other words, the obstacle B present in the periphery of the moving object 10 is defined in the map 30. A method of defining the obstacle B in the map 30 is not limited. For example, information indicating whether or not the obstacle B is present, an occupancy of the obstacle B, or a probability of presence of the obstacle B is defined at each position in the map 30.

In the present embodiment, the map 30 includes a plurality of area G. The area G is an area obtained by dividing the map 30 into a lattice shape along the coordinate axes of the coordinate space S. More specifically, the area G is each area obtained by dividing the map 30 by a plurality of lines parallel to the coordinate axes (the X axis and the Y axis) of the coordinate space S.

Thus, an outer frame of the area G is configured of a pair of orthogonal straight lines parallel, respectively, to the two coordinate axes of the coordinate space S. In other words, the area G is an area inside a frame line represented by four sides including a pair of straight lines (two sides) parallel to one coordinate axis (for example, the X axis) of the coordinate space S and a pair of straight lines (two sides) parallel to the other coordinate axis (for example, the Y axis) of the coordinate space S.

A size (area) of the area G is not limited. For example, it is preferable that the size of the area G be equal to or smaller than the obstacle B having the smallest size among the obstacles B as the determination targets or the obstacles B included in the map 30.

In addition, it is preferable that the size of the area G be equal to or smaller than a size of the specified shape area to be described later. In addition, when specified shape areas having different sizes are approximated by a process to be described later, it is preferable that the size of the area G be equal to or smaller than a size of a specified shape area having the smallest size.

Sizes of the respective areas G in the map 30 are preferably the same. In addition, shapes of the respective areas G in the map 30 are preferably the same. In addition, a description will be given assuming each of the areas G on the map 30 as a square. The shape of the area G is not limited to the square. For example, the shape of the area G may be a rectangle.

Figure 4:
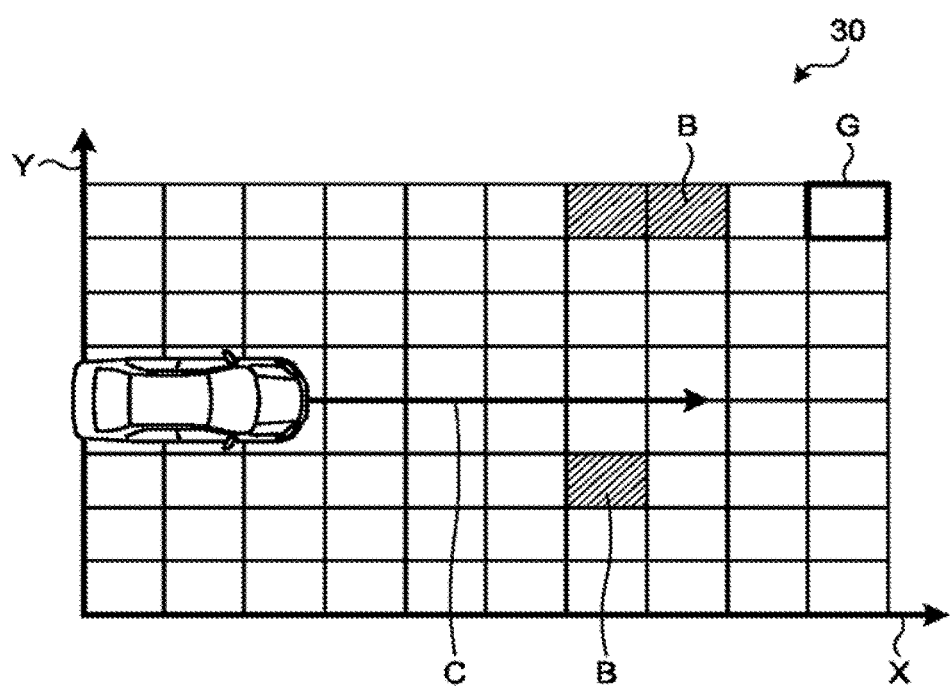
FIG. 4 is a schematic diagram illustrating an example of the map.

In the present embodiment, the map 30 indicates presence or absence of the obstacle B for each of the areas G. Thus, the obstacle B in the map 30 is represented, in detail, for each of the areas G (see the map 30 in FIG. 4, for example). FIG. 4 is a schematic diagram illustrating an example of the map 30. Specifically, information indicating the presence or absence of the obstacle B is defined for each of the areas G in the map 30 as illustrated in FIG. 4. In FIG. 4, the obstacle B in which the obstacle B is present is indicated in black, and the area G in which the obstacle B is not present is indicated in white. In addition, the map 30 may also represent an area at a position expanded from the area where the obstacle is present by a half a length of a horizontal width or a vertical width of the moving object 10 as the area where the obstacle B is present.

The information of the obstacle B to be defined in the area G may be any information that enables determination of the obstacle B. For example, the information of the obstacle B to be defined in the area G may be any of the information indicating the presence or absence of the obstacle B, the occupancy of the obstacle B, and the probability of presence of the obstacle B.

In addition, the area G is the area inside the frame line represented by the four sides including the pair of straight lines parallel to one coordinate axis (for example, the X axis) of the coordinate space S and the pair of straight lines parallel to the other coordinate axis (for example, the Y axis) of the coordinate space S as described above. Thus, the two sides among the four sides forming each of the areas G are parallel to one coordinate axis of the coordinate space S, and the other two sides are parallel to the other coordinate axis of the coordinate space S.

Returning to FIG. 3, the description will be continued. In addition, the movement route 32 obtained by the movement route acquirer 20B is arranged in the map 30. In the example illustrated in FIG. 3, a plurality of route points 33 (a route point 33A to a route point 33D) forming the movement route 32 are illustrated on the map 30.

For example, the map acquirer 20D arranges the route point 33 forming the movement route 32 of the movement route information acquired by the movement route acquirer 20B in the coordinate space S of the map 30. A known method may be used as a method of arranging the movement route 32 on the map 30.

The map acquirer 20D may acquire the map 30 by reading the map 30 generated by an external device or the like. For example, the map acquirer 20D may acquire the map 30 generated by the external device by receiving the map 30 via the communication unit 10D.

In addition, the map acquirer 20D may acquire the map 30 by generating the map 30. The map acquirer 20D may generate the map 30 using a known method other than using the coordinate space S having the direction along the traveling direction C of the traveling direction C as one of the coordinate axes.

For example, the map acquirer 20D defines the presence or absence of an obstacle B at each position in the periphery of the moving object 10. At this time, the map acquirer 20D defines the presence or absence of the obstacle B for each of the areas G in the coordinate space S in which the direction along the traveling direction C of the moving object 10 is one of coordinate axes. A known method may be used to define the presence or absence of the obstacle B.

For example, the map acquirer 20D analyzes peripheral information (for example, a captured image) obtained by the external sensor 10B using a known method to determine the presence or absence of the obstacle B for each of the areas G. Accordingly, the map acquirer 20D defines the presence or absence of the obstacle B in each of the areas G in the coordinate space S of the coordinate axis along the traveling direction C. The map acquirer 20D may define the occupancy of the obstacle B and the probability of presence of the obstacle B in each of the areas G.

Further, the map acquirer 20D further arranges the movement route 32 acquired by the movement route acquirer 20B in the coordinate space S. For example, the map acquirer 20D arranges the movement route 32 by arranging each of the route points 33 at a position in the coordinate space S corresponding to each of the route points 33 forming the movement route 32.

In this manner, the map acquirer 20D may generate the map 30.

Next, the approximation processor 20E will be described. The approximation processor 20E approximates the movement route 32 of the moving object 10 with the specified shape area along the coordinate axis in the coordinate space S of the map 30.

Figure 5A:
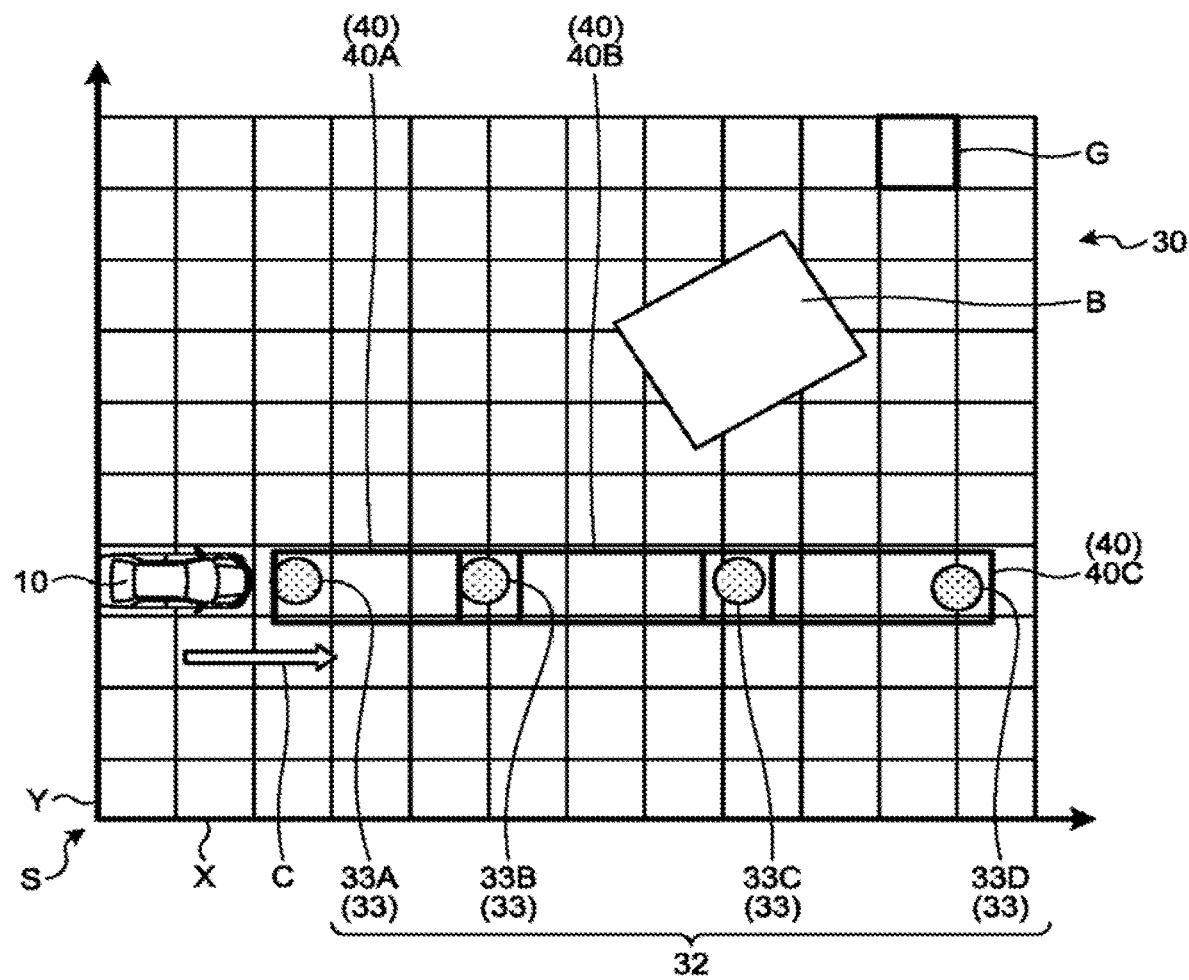
FIG. 5A is an explanatory diagram of a specified shape area.

FIG. 5A is an explanatory diagram of a specified shape area 40. The specified shape area 40 is a basic unit of collision determination. In the information processing device 20, the collision determination is performed using the specified shape area 40 as the basic unit of collision determination. That is, the information processing device 20 performs collision determination depending on whether or not a target is present in the specified shape area 40.

The approximation processor 20E may approximate the movement route 32 with the single specified shape area 40 or a plurality of the specified shape areas 40. When the approximation processor 20E approximates the movement route 32 with the plurality of specified shape areas 40, at least some of the plurality of specified shape areas 40 may overlap each other or do not necessarily overlap each other.

In the present embodiment, a case where the approximation processor 20E approximates the single movement route 32 with the plurality of specified shape areas 40 will be described as an example.

The shape of the specified shape area 40 may be any shape along the movement route 32 and the coordinate axes in the coordinate space S of the map 30. For example, the shape of the specified shape area 40 may be any of an elongated shape which is long elliptical shape along the movement route 32, a polygonal shape along the movement route 32, a quadrangular shape along the movement route 32, or a rectangular shape along the movement route 32. The shape of the specified shape area 40 is preferably a rectangular shape from the viewpoint of improvement in processing speed. For example, the shape of the specified shape area 40 is preferably a rectangle or a square.

When the shape of the specified shape area 40 is the rectangular shape, four sides forming the specified shape area 40 are four sides parallel to the coordinate axes in the coordinate space S of the map 30. That is, the specified shape area 40 has a rectangular shape represented by the four sides parallel to the coordinate axes in the coordinate space S. That is, the four sides forming an outer frame of the specified shape area 40 are represented by the four sides including a pair of straight lines (two sides) parallel to one coordinate axis (for example, the axis) of the coordinate space S and a pair of straight lines (two sides) parallel to the other coordinate axis (for example, the Y axis) of the coordinate space S. Thus, the specified shape area 40 is an area corresponding to each of the one or a plurality of areas G in this case.

In the present embodiment, the case where the shape of the specified shape area 40 is the rectangular shape will be described as an example.

The size of the specified shape area 40 is not limited. However, it is preferable that the size of the specified shape area 40 be a size in response to the target (obstacle B) or the moving object 10 or a size obtained by considering approximation accuracy of the movement route 32.

For example, when the size of the specified shape area 40 is set based on the size of the obstacle B, the size is preferably equal to or smaller than the size of the obstacle B. Specifically, it is preferable that the size of the specified shape area 40 be equal to or smaller than the size of the obstacle B having the smallest size. The obstacle B having the smallest size may be the obstacle B having the smallest size among the obstacles B included in the map 30 or may be an obstacle B having the smallest size that has been assumed in advance as a lower limit value of the size of the target to be determined as the obstacle B.

Specifically, the size of the specified shape area 40 is preferably set such that a length of a line segment in a crossing direction (for example, a Y-axis direction) crossing a line segment along the traveling direction C in the specified shape area 40 (that is, one of the coordinate axes (the X axis in FIG. 5A) of the coordinate space S) is equal to or smaller than a length of a line segment in the crossing direction (for example, the Y-axis direction) of the obstacle B. More specifically, the length of the line segment in the crossing direction in the specified shape area 40 is preferably equal to or smaller than a length of a line segment in the crossing direction of the obstacle B whose length of the line segment in the crossing direction is the shortest among the obstacles B included in the map 30.

When the size of the specified shape area 40 is set in consideration of the approximation accuracy of the movement route 32, for example, it is preferable to set a condition that a route direction of a route included in the specified shape area 40 is equal to or smaller than an inclination threshold set with respect to the coordinate axis, or that a length of a diagonal line segment of the specified shape area 40 is equal to or smaller than a set length threshold.

The approximation processor 20E approximates the movement route 32 with the specified shape area 40 so as to satisfy the above-described conditions.

For example, the approximation processor 20E approximates the specified shape area 40 having a pair of the route points 33 adjacent to each other in the route direction in the movement route 32 as both ends. For example, as illustrated in FIG. 5A, the approximation processor 20E approximates a specified shape area 40A having the route point 33A and the route point 33B adjacent in the route direction as both ends. Similarly, the approximation processor 20E approximates a specified shape area 40B having the route point 33B and the route point 33C adjacent in the route direction as both ends. In addition, the approximation processor 20E approximates the route with a specified shape area 40C having the route point 33C and the route point 33D adjacent in the route direction as both ends. In addition, for example, when the route is inclined with respect to the coordinate axis as indicated by the route points 33B and 33C in FIG. 6, the approximation is performed such that both ends thereof are diagonal as in a specified shape area 42. In this manner, the approximation processor 20E approximates the single movement route 32 with one or a plurality of specified shape areas 40.

The specified shape area 40 is not approximated in the unit of the area G in the example illustrated in FIG. 5A. As illustrated in FIG. 5B, however, the specified shape area 40 may be approximated in the unit of the area G including a route point sequence (see a specified shape area 40A', a specified shape area 40B', and a specified shape area 40C').

There is a case where density of the route points 33 forming the movement route 32 is low (an interval between the adjacent route points 33 is large) so that the size condition described above is not satisfied.

In this case, the approximation processor 20E may perform approximation with the specified shape area 40 after interpolating a new route point 33 between the route points 33 forming the movement route 32 acquired by the movement route acquirer 20B.

Figure 6:
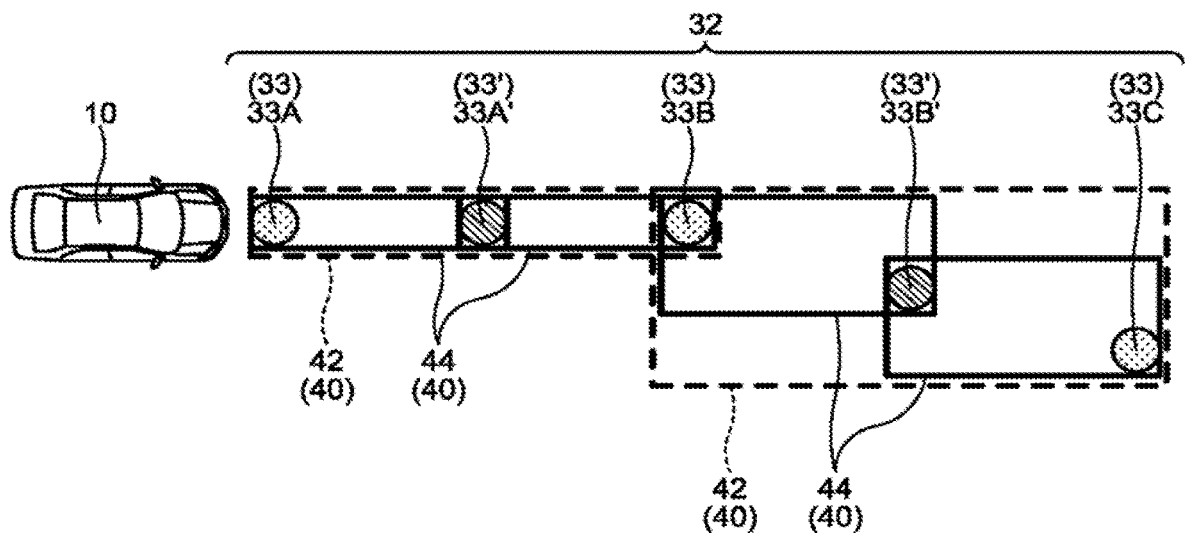
FIG. 6 is an explanatory diagram of interpolation of a route point.

FIG. 6 is an explanatory diagram of interpolation of a route point 33'. For example, when the distance between a pair of the route points 33 adjacent in the route direction on the movement route 32 is equal to or larger than a threshold, the approximation processor 20E performs interpolation using the new route point 3' between the pair of route points 33. For example, the approximation processor 20E performs interpolation using the new route points 33' (a route point 33A' and a route point 33B'), respectively, between the route point 33A and the route point 33B and between the route point 33B and the route point 33C.

Further, the approximation processor 20E performs approximation with the specified shape area 40 having the pair of route points (the route point 33 and the route point 33') adjacent in the route direction as both ends. Thus, in this case, the approximation processor 30E can approximate a specified shape area 44 having a smaller size as the specified shape area 40 when compared with the specified shape area 42 approximated without interpolation using the new route point 33'.

The above-described threshold used for determination on whether to interpolate the new route point 33' may be appropriately adjusted.

The plurality of specified shape areas 40 approximated by the approximation processor 20E for the single movement route 32 may have the same size or may have different sizes.

For example, the approximation processor 20E may approximate the specified shape area 40 such that a size of the specified shape area 40 approximated for a curved area in the movement route 32 is smaller than a size of the specified shape area 40 approximated for an area other than the curved area in the movement route 32.

Figure 7:
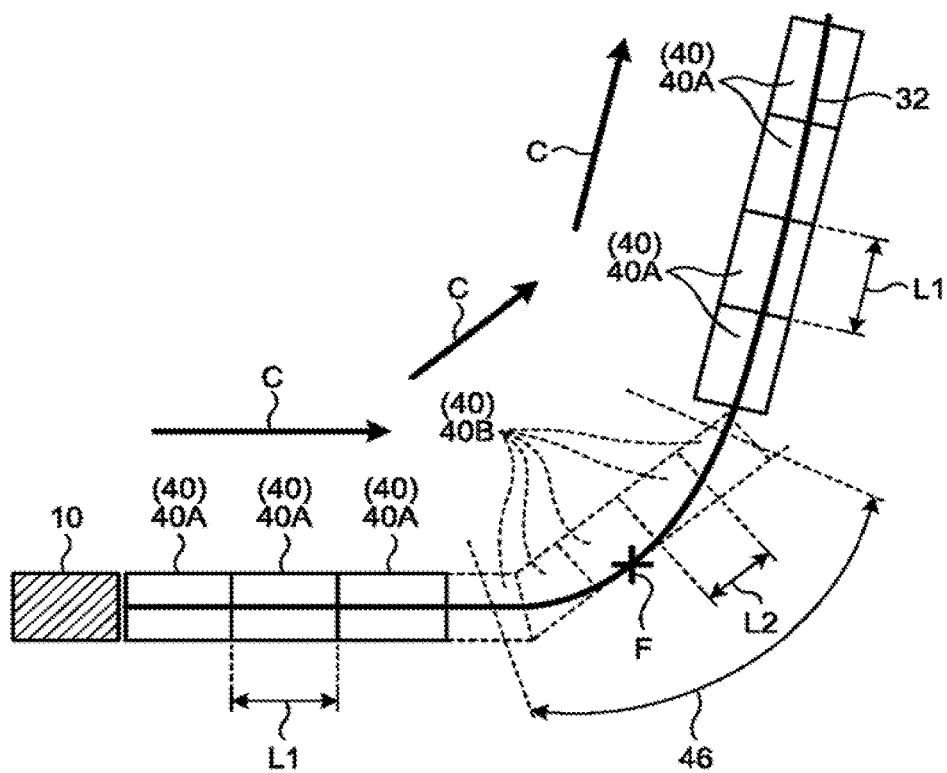
FIG. 7 is an explanatory view illustrating an example of the specified shape area.

FIG. 7 is an explanatory view illustrating an example of approximation of the specified shape area 40. For example, it is assumed that the movement route 32 includes a curved area 46.

The curved area 46 is an area having a curvature equal to or larger than a threshold in the movement route 32. This threshold may be set in advance. In addition, this threshold may be appropriately changeable according to an operation instruction of the input device 10J from the user or the like.

The curved area 46 includes an inflection point F. The inflection point F is a position (point) having the largest curvature in the curved area 46. It is also possible to place a plurality of the inflection points F at positions having curvatures equal to or larger than the threshold other than the position having the largest curvature.

In the case where the curved area 46 is included in the movement route 32, the approximation processor 20E preferably approximate the specified shape area 40 such that a length L2 in a direction along the traveling direction C of the specified shape area 40 (referred to as the specified shape area 40B) overlapping the curved area 46 in the movement route 32 is smaller than a length L1 in a direction along the traveling direction C of the specified shape area 40 (referred to as the specified shape area 40A) which does not overlap the curved area 46 in the movement route 32.

The traveling direction C in each of the specified shape areas 40 is a movement direction when the moving object 10 moves in each of the specified shape areas 40 in the movement route 32.

The approximation processor 20E may specify the curved area 46 including the inflection point F and the inflection point F in the movement route 32 by analyzing a curvature of each position in the movement route 32 using a known method.

In addition, the approximation processor 20E may specify the inflection point F and the curved area 46 by analyzing a center line of a road along the movement route 32 represented in the captured image acquired by the external sensor 10B. For example, there is a case where the center line does not include a non-differentiable area. In this case, the approximation processor 20E specifies a position on the movement route 32 corresponding to a position where a curvature in the center line is equal to or larger than the threshold, as the inflection point F. In addition, for example, there is a case where the center line includes the non-differentiable area. In this case, the approximation processor 20E may specify a position on the movement route 32 corresponding to a non-differentiable point (discontinuous point) in the center line, as the inflection point F. In addition, when a map is provided, the inflection point F is specified from a shape of a road on the map.

Here, where the moving object 10 moves along the movement route 32 having the curved area 46, the traveling direction C of the moving object 10 changes before and after reaching the curved area 46. That is, the traveling direction C of the moving object 10 traveling on the movement route 32 is different before and after the inflection point F.

Thus, the processor 20A includes the rotator 20F in the present embodiment.

The rotator 20F rotates the map 30. The rotator 20F rotates the map 30 such that one of the coordinate axes of the coordinate space S becomes the direction along the traveling direction C.

For example, the rotator 20F rotates the map 30 at a position where a difference between a straight line C' indicating the traveling direction C identified in the map 30 before being rotated and a passage-scheduled position in the route direction of the movement route 32 is equal to or larger than a threshold. The position where the difference between the traveling direction C and the passage-scheduled position in the route direction of the movement route 32 is equal to or larger than the threshold is a position inside the route area to be described later, and specifically, a position of the inflection point F.

Figure 8:
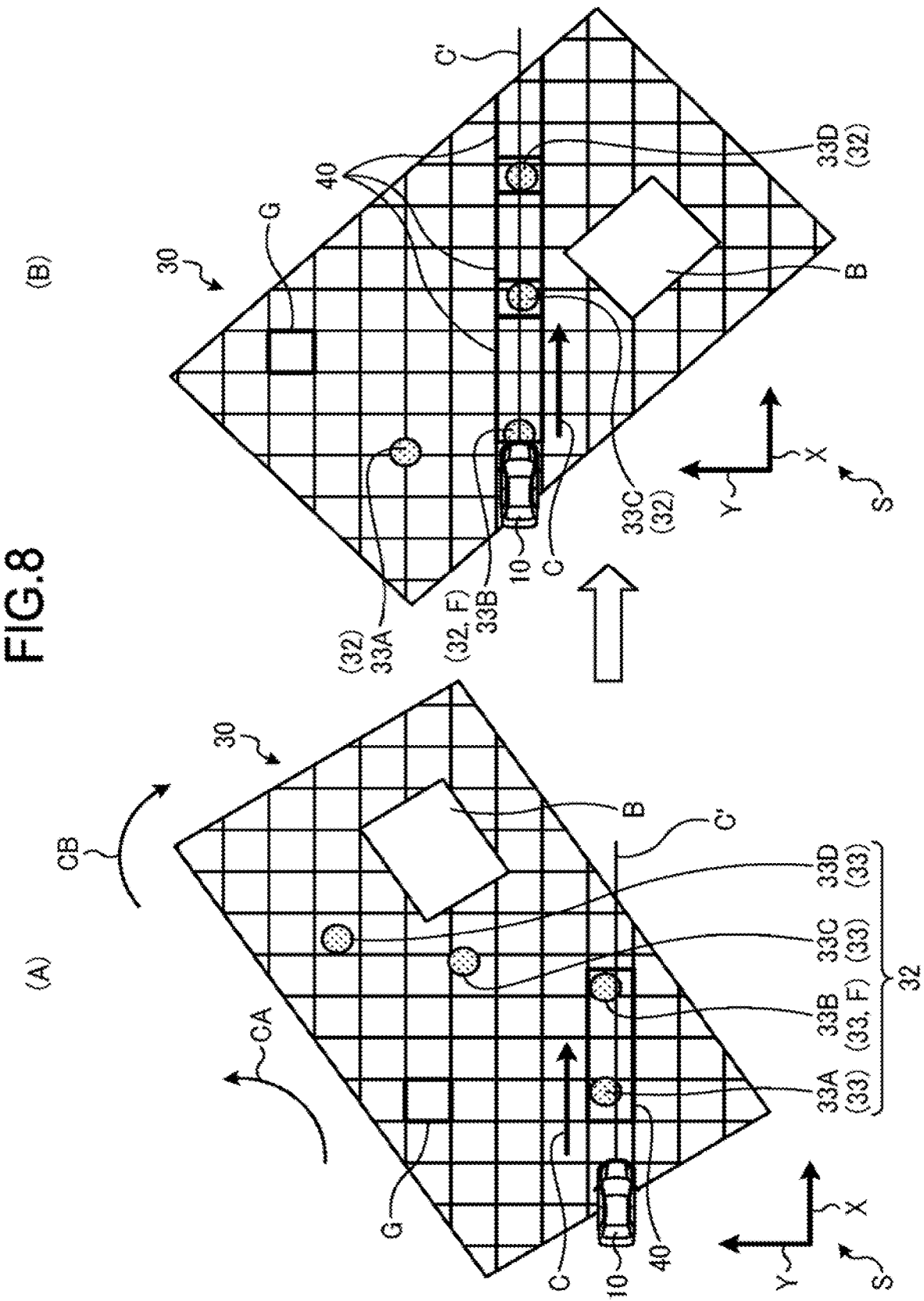
FIG. 8 is an explanatory diagram illustrating examples of rotation of the map.

FIG. 8 is an explanatory diagram illustrating examples of rotation of the map 30. For example, when the inflection point F is present in the movement route 32, the rotator 20F rotates the map 30 such that one of the coordinate axes becomes the direction along the traveling direction C of the moving object 10 at the inflection point F before the specified shape area 40 is approximated for an area on the downstream side in the movement direction from the inflection point F in the movement route 32.

The rotator 20F rotates the map 30 in the opposite direction (a direction of arrow CB in FIG. 8) to a direction (a direction of arrow CA in FIG. 8) in which the movement route 32 is bent at the inflection point F.

For example, as illustrated in (A) of FIG. 8, it is assumed that the movement route 32 illustrated in the map 30 is a route bent in the direction of the arrow CA (hereinafter, referred to as a bending direction) at the route point 33B which is the inflection point F. Further, it is assumed that a current position of the moving object 10 is positioned on the upstream side in the traveling direction C from the route point 33B which is the inflection point F.

In this case, the approximation processor 20E performs approximation with the specified shape area 40 using the map 30 in which a direction along the traveling direction C of the moving object 10 at the current position is one of the coordinate axes (for example, the X axis) in the coordinate space S.

Thus, the specified shape area 40 approximated from the map 30 illustrated in (A) of FIG. 8, for example, has a rectangular shape including two sides parallel to the X axis and two sides parallel to the Y axis which are the coordinate axes of the map 30.

Further, it is assumed that the current position of the moving object 10 reaches the inflection point F (the route point 33B). Then, the rotator 20F identifies the traveling direction C when the moving object 10 is positioned at the inflection point F. The rotator 20F may identify the traveling direction C of the moving object 10 at any position on the upstream side than the other inflection point F on the downstream side of the movement direction of the moving object 10 than the inflection point F from the inflection point F.

Further, the rotator 20F rotates the map 30 such that one of the coordinate axes of the coordinate space S in the map 30 becomes the direction along the traveling direction C that has been newly identified (see (B) of FIG. 8). At this time, the rotator 20F rotates the map 30 in the opposite direction (direction of the arrow CB or an anti-bending direction) in the direction of the arrow CA which is the bending direction.

Thus, the coordinate axis (for example, the Y axis) of the coordinate space S of the rotated map 30 becomes the direction along the traveling direction C when the moving object 10 is positioned at the route point 33B which is the inflection point F as illustrated in (B) of FIG. 8.

Further, the approximation processor 20E approximates an area on the downstream side in the traveling direction C than the inflection point F on the movement route 32 with the specified shape area 40 in the same manner as described above using the rotated map 30. For example, the approximation processor 30E approximates an area in the traveling direction C parallel to the coordinate axis (X axis) of the map 30 in the movement route 32 with the specified shape area 40 using the rotated map 30.

Thus, the specified shape area 40 approximated from the rotated map 30 illustrated in (B) of FIG. 8, for example, has the rectangular shape including the two sides parallel to the X axis, which is the coordinate axis of the rotated map 30, and the two sides parallel to the Y axis.

In the present embodiment, the rotator 20F rotates the map 30 for each route area between the inflection points F adjacent to each other along the movement route 32 in the movement route 32. Further, the approximation processor 20E approximates the specified shape area 40 for each route area using the map 30 rotated by the rotator 20F.

Figure 9:
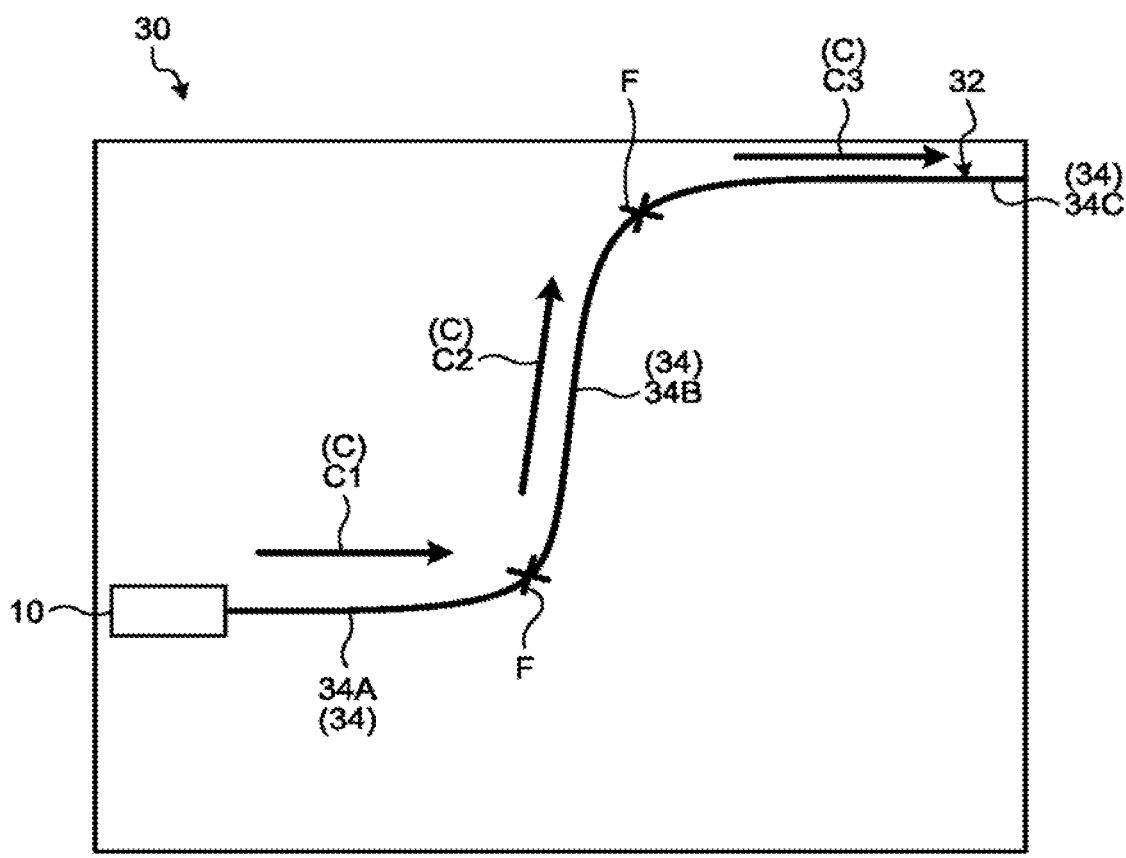
FIG. 9 is an explanatory diagram of a route area.

FIG. 9 is an explanatory diagram of the route area 34. For example, it is assumed that the movement route 32 includes the two inflection points F. In this case, the approximation processor 20E divides the movement route 32 in the map 30 into the plurality of route areas 34 with the inflection point F as a dividing position. For example, the approximation processor 20E divides the movement route 32 illustrated in the map 30 into a route area 34A from the current position of the moving object 10 to the nearest inflection point F in the movement route 32, a route area 34B from the corresponding inflection point F to a different inflection point F adjacent to the corresponding inflection point F, and a route area 34C from the corresponding inflection point F to a different inflection point F adjacent to the corresponding inflection point F.

Further, when the current position of the moving object 10 is present on the route area 34A, the rotator 20F rotates the map 30 so as to be the coordinate space S of the coordinate axis along the traveling direction C (a direction of arrow C1 in FIG. 9) when the moving object 10 travels in the route area 34A in the movement route 32. Further, the approximation processor 20E approximates the route area 34A of the movement route 32 with the specified shape area 40 using the rotated map 30. The approximation may be performed using the single specified shape area 40 or the plurality of specified shape areas 40 for the single route area 34A. In addition, a part of the adjacent specified shape areas 40 may overlap each other.

When the current position of the moving object 10 is present on the route area 34B, the rotator 20F rotates the map 30 so as to be the coordinate space S of the coordinate axis along the traveling direction C (a direction of arrow C2 in FIG. 9) when the moving object 10 travels in the route area 34B in the movement route 32. Further, the approximation processor 20E approximates the route area 34B of the movement route 32 with the specified shape area 40 using the rotated map 30.

In addition, when the current position of the moving object 10 is present on the route area 34C, the rotator 20F rotates the map 30 so as to be the coordinate space S of the coordinate axis along the traveling direction C (a direction of arrow C3 in FIG. 9) when the moving object 10 travels in the route area 34C in the movement route 32. Further, the approximation processor 20E approximates the route area 34C of the movement route 32 with the specified shape area 40 using the rotated map 30.

In this manner, the approximation processor 20E performs approximation at each position of the movement route 32 with the specified shape area 40 along the coordinate axis of the traveling direction C when the moving object 10 travels in each position.

A known method may be used to rotate the map 30 by the rotator 20F.

For example, the rotator 20F performs coordinate transformation of components of the map 30 from a position before rotation to a position after rotation, sequentially, along the coordinate axis in the coordinate space S of the map 30 before being rotated. That is, the rotator 20F sequentially loads the map 30 in the direction along the coordinate axis of the coordinate space S of the map 30 before being rotated, and performs the coordinate transformation of each component. The component represents each element obtained by dividing the map 30 into a plurality of elements. The component represents a pixel, for example, when the map 30 is represented by a plurality of pixels. The component may be one pixel or a plurality of pixels adjacent to each other. In addition, it is also possible to regard the area G as one pixel. In this manner, the rotator 20F may rotate the map 30 such that one of the coordinate axes of the coordinate space S becomes the direction along the traveling direction C.

Returning to FIG. 2, the description will be continued. The determiner 20G performs collision determination in response to the obstacle B (target) in the specified shape area 40 approximated by the approximation processor 20E.

For example, the determiner 20G determines whether the obstacle B is present in the specified shape area 40 approximated in the map 30. When information indicating the presence of the obstacle B is defined in the area G overlapping the specified shape area 40 in the map 30, the determiner 20G determines that the obstacle B is present in the specified shape area 40. It is preferable that the determiner 20G sequentially load maps along the coordinate axis of the map and determine whether the information indicating the presence of the obstacle B is defined in the specified shape area 40.

Further, when determining that the obstacle B is present in the specified shape area 40, the determiner 20G outputs the collision determination result information indicating that there is a possibility of collision to the output controller 20H. In addition, when determining that the obstacle B is not present in the specified shape area 40, the determiner 20G outputs collision determination result information indicating that there is no possibility of collision to the output controller 20H.

The timing of approximation of the specified shape area 40 performed by the approximation processor 20E and the rotator 20F is not limited. For example, the approximation processor 20E and the rotator 20F perform the approximation of the specified shape area 40 and the rotation of the map 30 while the moving object 10 is traveling along the movement route 32. The approximation processor 20E may perform the approximation of the specified shape area 40 and the rotation of the map 30 over the entire area of the movement route 32 before the moving object 10 travels in the movement route 32.

Next, the output controller 20H will be described. The output controller 20H outputs at least one of the approximation result information and the collision determination result information to at least one of the output unit 10A and the power controller 10G.

The approximation result information is information that defines the specified shape area 40 approximated by the approximation processor 20E on the map 30.

In the present embodiment, the output controller 20H displays the display screen including the approximation result information on the display 10E. The display screen may be a screen including the collision determination result information or a screen including both the approximation result information and the collision determination result information.

Figure 10:
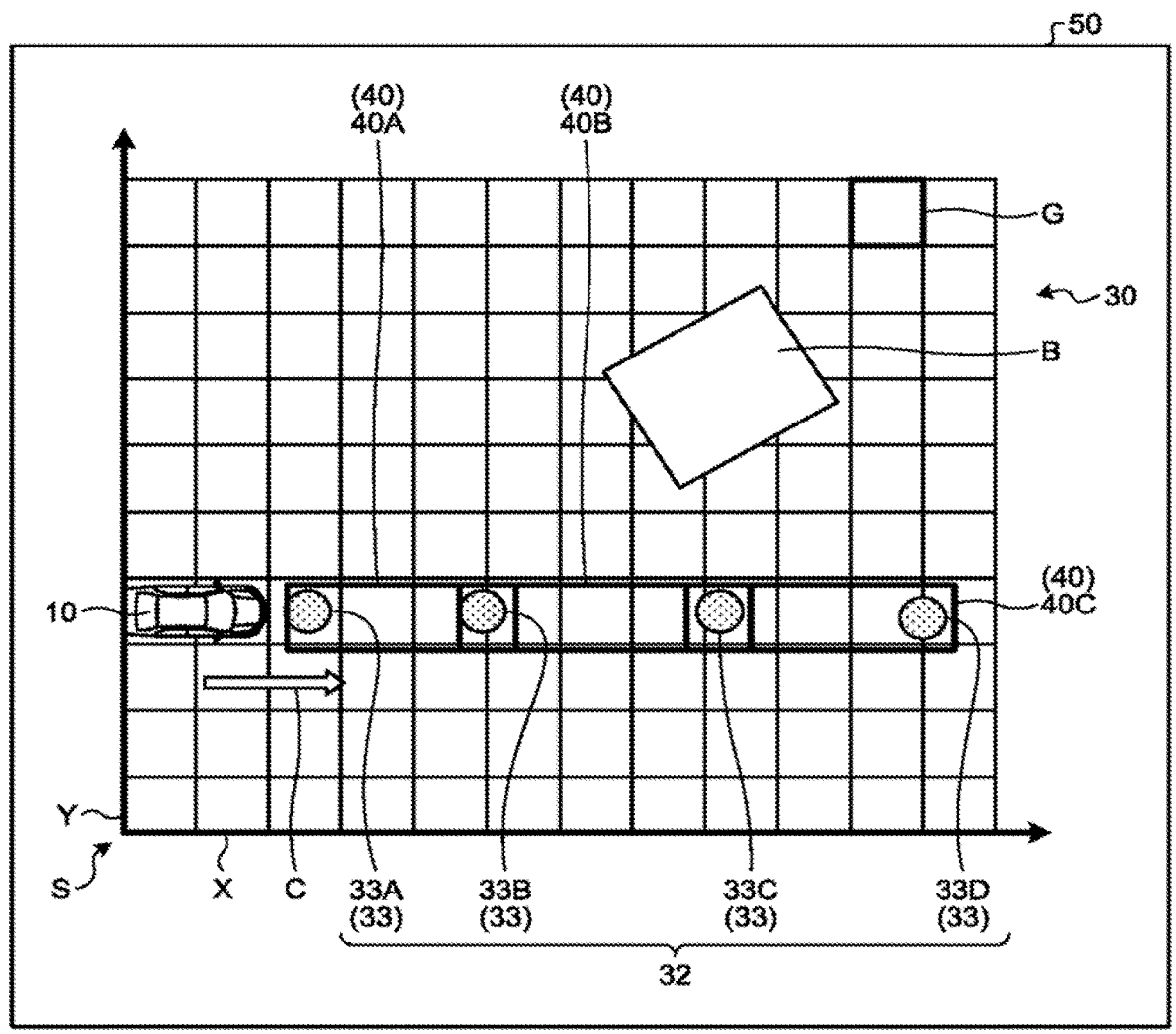
FIG. 10 is a schematic diagram illustrating an example of a display screen.

FIG. 10 is a schematic diagram illustrating an example of a display screen 50. The display screen 50 includes the approximation result information defining the specified shape area 40 approximating the movement route 32 of the moving object 10 along the coordinate axis on the map 30 defining the obstacle B in the coordinate space S of the coordinate axis along the traveling direction C of the moving object 10.

The user can easily recognize that a basic unit of collision determination is the specified shape area 40 approximating the movement route 32 along the coordinate axis of the coordinate space S representing the map 30 by confirming the display screen 50.

Returning to FIG. 2, the description will be continued. In addition, the output controller 20H may control the display 10E and the speaker 10F so as to output sound or light indicating at least one of the approximation result information and the collision determination result information. In addition, the output controller 20H may transmit at least one of the approximation result information and the collision determination result information to an external device via the communication unit 10D.

In addition, the output controller 20H may output at least one of the approximation result information and the collision determination result information to the power controller 10G.

In this case, for example, the power controller 10G controls the power unit 10H in response to the collision determination result information received from the output controller 20H. For example, the power controller 10G may generate a power control signal, configured to control the power unit 10H, in response to the collision determination result information, and control the power unit 10H. The power control signal is a control signal configured to control a drive unit that performs driving relating to traveling of the moving object 10 in the power unit 10H. For example, the power controller 10G controls steering, engine, and the like of the moving object 10 such that the moving object 10 travels in a real space avoiding the obstacle B indicated by the collision determination result information.

Figure 11:
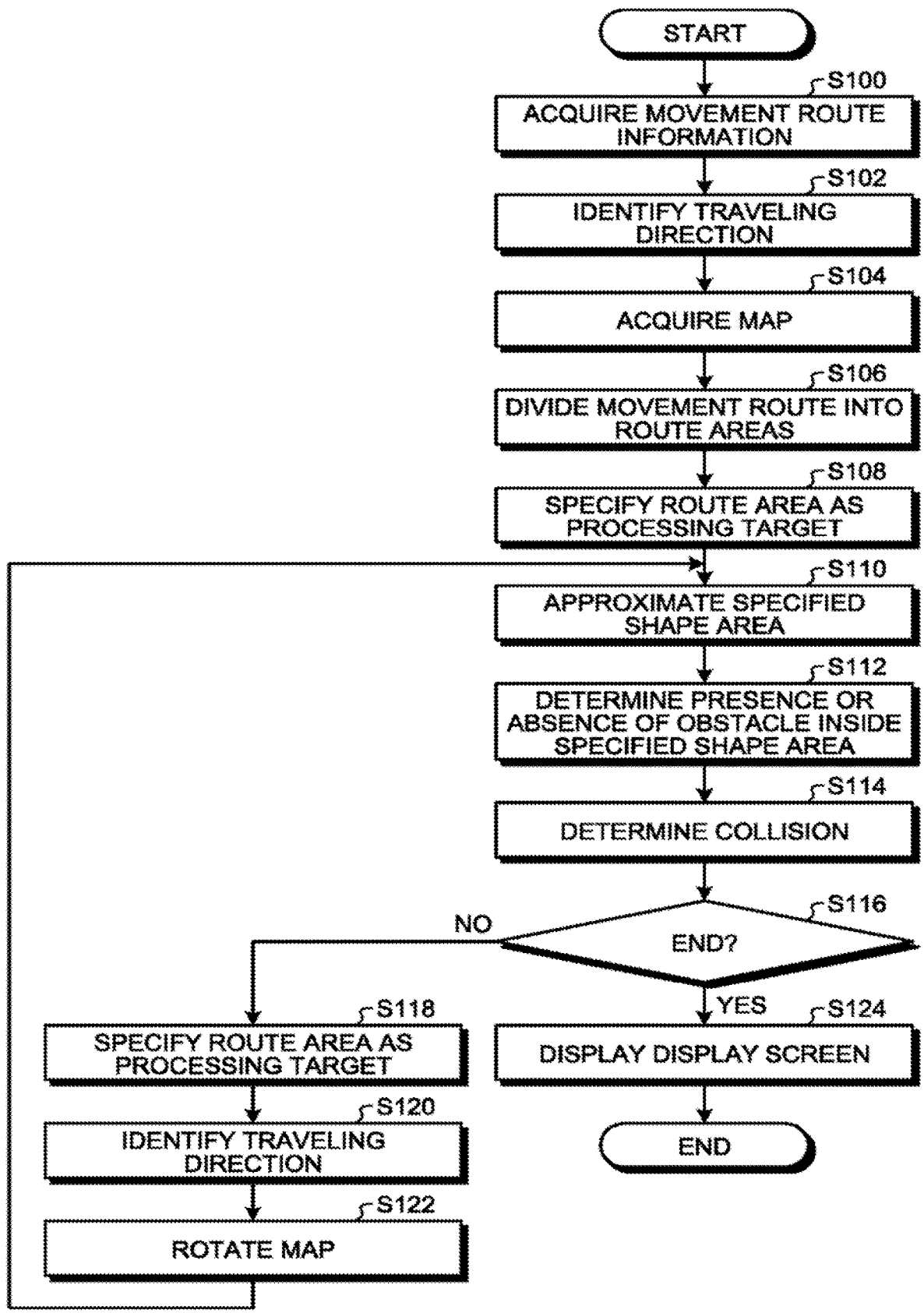
FIG. 11 is a flowchart illustrating an example of a procedure of information processing.

Next, an example of a procedure of information processing executed by the information processing device 20 will be described. FIG. 11 is a flowchart illustrating an example of the procedure of information processing.

First, the movement route acquirer 20B acquires the movement route information (Step S100). Next, the traveling direction identifier 20C identifies the traveling direction of the moving object 10 (Step S102). For example, the traveling direction identifier 20C identifies a current traveling direction of the moving object 10 in Step S102.

Next, the map acquirer 20D acquires the map 30 (Step S104). For example, the map acquirer 20D defines the obstacle B in the coordinate space S in which the direction along the traveling direction C identified in Step S102 is one of the coordinate axes, and further acquires the map 30 in which the movement route indicated by the movement route information acquired in Step S100 is arranged.

Next, the approximation processor 20E divides the movement route 32 illustrated in the map 30 acquired in Step S104 into the plurality of route areas 34 with the inflection point F as the dividing point (Step S106). When the movement route 32 does not include the inflection point F, the approximation processor 20E may treat the entire movement route 32 illustrated in the map 30 as the single route area 34.

Hereinafter, a case where the approximation processor 20E divides the movement route 32 into the plurality of route areas 34 will be described as an example.

Next, the approximation processor 20E specifies the route area 34 as a processing target (Step S108). In Step S108, the approximation processor 20E specifies the route area 34 in which a traveling direction of the moving object 10 traveling in the corresponding route area 34 matches the traveling direction C identified in Step S102, among the plurality of route areas 34 obtained by the division in Step S106 as the processing target.

Next, the approximation processor 20E approximates the route area 34 specified as the processing target with the specified shape area 40 (Step S110). The approximation processor 20E approximates the route area 34 in the movement route 32 with the specified shape area 40 along the coordinate axis along the traveling direction C.

The determiner 20G determines the presence or absence of the obstacle B in the specified shape area 40 approximated in Step S110 in the map 30 (Step S112). Further, the determiner 20G performs a collision determination using the determination result in Step S112 (Step S114). The collision determination result information is derived by the process in Step S114.

Next, the processor 20A determines whether or not to end the processing (Step S116). For example, the processor 20A performs the determination in Step S116 by discriminating whether or not the processes in Step S110 to Step S114 have been executed for all the route areas 34 obtained by the division in Step S106. In addition, the processor 20A may determine to end the processing when receiving a signal indicating an engine stop of the moving object 10 or a signal indicating an end of the obstacle determination process.

When it is determined to be negative in Step S116 (Step S116: No), the process proceeds to Step S118.

In Step S118, the approximation processor 20E specifies the route area 34 as the processing target (Step S118). In Step S118, the approximation processor 20E specifies one of the unprocessed route areas 34, which are not subjected to the processes in Step S110 to Step S114 among the route areas 34 obtained by the division in Step S106, as the route area 34 which is the processing target. For example, the approximation processor 20E specifies the unprocessed route area 34 adjacent to the route area 34 approximated by the specified shape area 40 in the previous time as the route area 34 which is the processing target.

Next, the rotator 20F identifies the traveling direction C when the moving object 10 travels in the route area 34 specified in Step S118 (Step S120). The traveling direction C in Step S120 may be identified by the traveling direction identified 20C. Further, the rotator 20F rotates the map 30 so as to be the coordinate space S of the coordinate axis along the traveling direction C identified in Step S120 (Step S122). Further, the processing returns to Step S110 described above.

Thus, the approximation processor 20E can approximate each of the route areas 34 in the movement route 32 with the specified shape area 40 using the map 30 rotated so as to be the coordinate space S of the coordinate axis along the traveling direction C when the moving object 10 travels in each of the route areas 34.

On the other hand, when it is determined to be positive in Step S116 (Step S116: Yes), the processing proceeds to Step S124. In Step S124, the output controller 20H displays the display screen 50, which includes the approximation result information defined the specified shape area 40 approximated in Step S110 on the display 10E (Step S124). The output controller 20H may perform control to output at least one of the approximation result information and the collision determination result information in Step S114 to the output unit 10A. Further, this routine is ended.

As described above, the information processing device 20 according to the present embodiment includes the map acquirer 20D and the approximation processor 20E. The map acquirer 20D acquires the map 30 defining the target (obstacle B) in the coordinate space S in which the direction along the traveling direction C of the moving object 10 is one of coordinate axes. The approximation processor 20E approximates the movement route 32 of the moving object 10 with the specified shape area 40 serving as the basic unit of collision determination along the coordinate axis in the coordinate space S.

Figure 12:
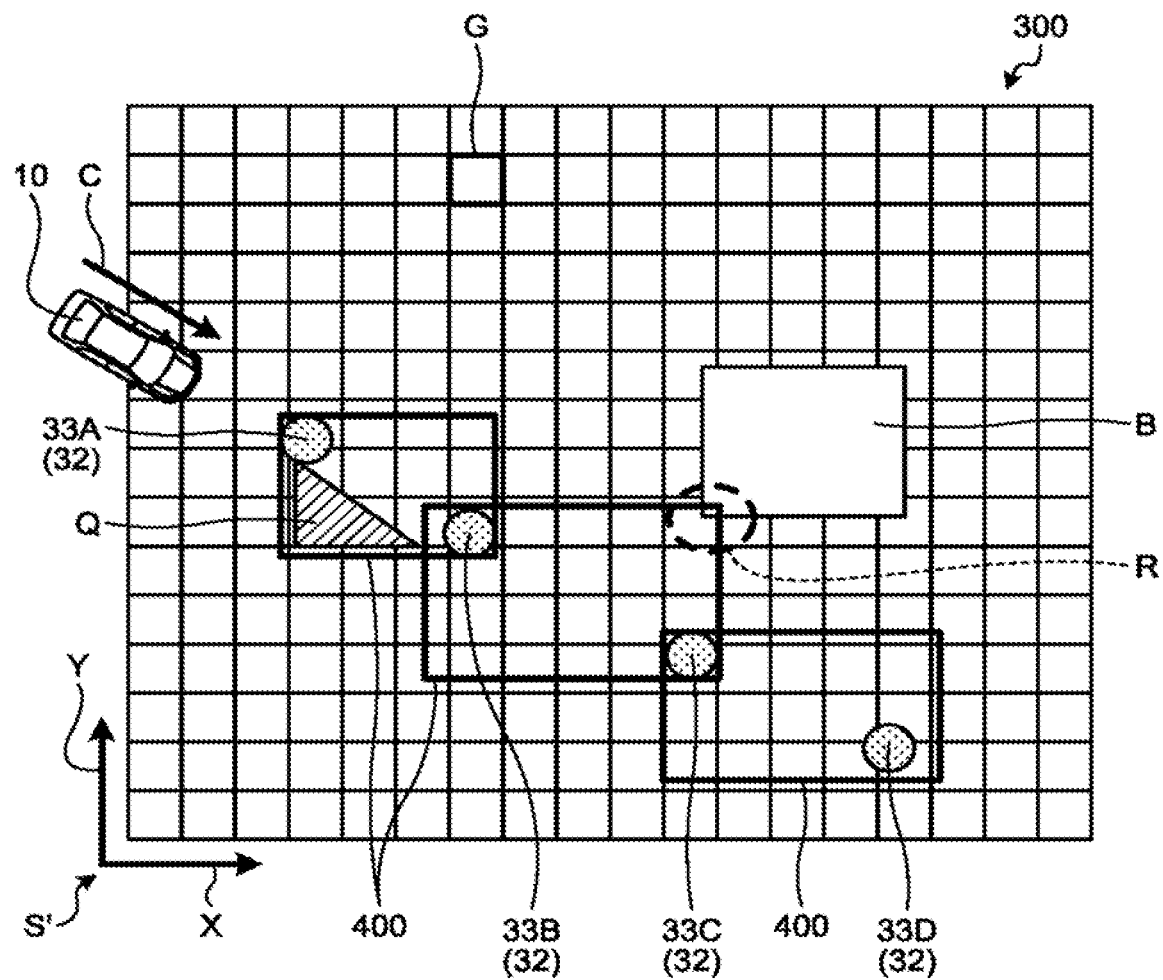
FIG. 12 is an explanatory diagram illustrating an example of a conventional method.

Here, it is difficult to perform collision determination with high accuracy in the conventional method. FIG. 12 is an explanatory diagram illustrating an example of the conventional method.

As illustrated in FIG. 12, conventionally, the collision determination is performed using a comparative map 300. The comparative map 300 is a map that defines an obstacle B in the unit of an area G which is a section along a coordinate axis in a comparative coordinate space S' defined by two orthogonal coordinate axes (an X axis and a Y axis). However, the comparative coordinate space S' of the comparative map 300 is defined by the coordinate axes (the X axis and the Y axis) directed in a direction different from a traveling direction C of a moving object 10 (not along the traveling direction C). Further, conventionally, a comparative area 400 along a coordinate axis, which is completely different from the traveling direction C of the moving object 10, is used as a basic unit of collision determination.

Thus, the larger comparative area 400 is set as an inclination of the coordinate axis of the comparative coordinate space S' with respect to the traveling direction C of the moving object 10 increases in the conventional method. Thus, there is a case where the comparative area 400 including a range Q unnecessary for the obstacle determination is set. In addition, there is a case where it is erroneously determined that the obstacle B is present even in the comparative area 400 in which the possibility of collision is actually low in the conventional method (see an area R). Thus, the determination accuracy is low in the conventional method.

On the other hand, the information processing device 20 according to the present embodiment uses the specified shape area 40 approximating the movement route 32 of the moving object 10 along the coordinate axis in the direction along the traveling direction C as the basic unit of collision determination. Thus, the information processing device 20 according to the present embodiment can perform approximation with the specified shape area 40 having a shape along the movement route 32. That is, the information processing device 20 according to the present embodiment can approximate an area where the possibility that the moving object 10 actually passes therethrough is high as the specified shape area 40 which is the basic unit of collision determination, when compared with the conventional method.

Therefore, the collision determination can be performed at high speed and with high accuracy in the information processing device 20 according to the present embodiment by performing the collision determination using the specified shape area 40.

The case where the coordinate space S is the two-dimensional Cartesian space has been described as an example in the present embodiment. As described above, however, the coordinate space S may be the three-dimensional Cartesian space.

Figure 13:
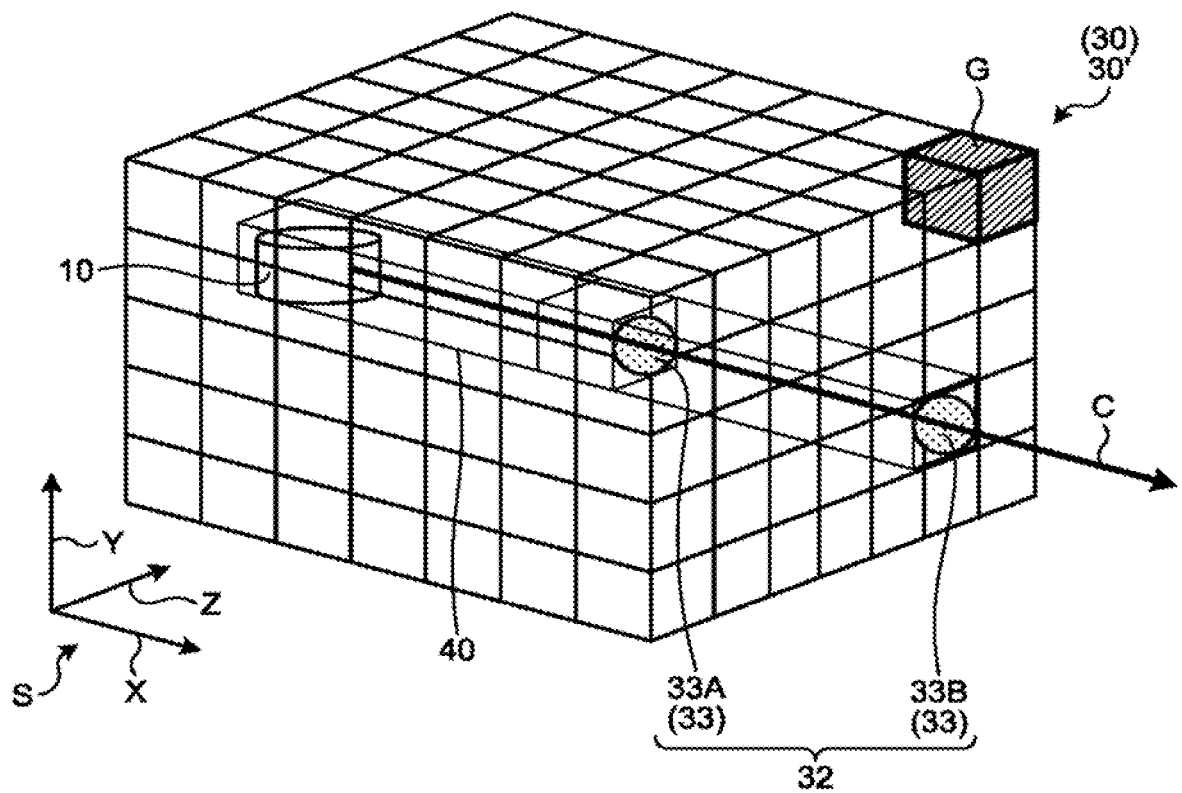
FIG. 13 is an explanatory diagram of a three-dimensional Cartesian space.

FIG. 13 is an explanatory diagram when the coordinate space S is the three-dimensional Cartesian space. In this case, the coordinate space S is a space represented by three coordinate axes (an X axis, a Y axis, and a Z axis) orthogonal to each other.

Even in this case, the information processing device 20 may perform approximation with the specified shape area 40 in the same manner as described above.

Specifically, the map acquirer 20D may acquire a map 30' in this case. The map 30' is the same as the map 30 except that the coordinate space S is the three-dimensional Cartesian space. That is, the map 30' is a map that defines a target (the obstacle B in the present embodiment) in the coordinate space S in which a direction along the traveling direction C of the moving object 10 is one of coordinate axes. In addition, the movement route 32 is arranged in the map 30'.

Further, one of the coordinate axes of the coordinate space S of the map 30' is set as the direction along the traveling direction C of the moving object 10. Specifically, one coordinate axis (that is, the X axis, the Y axis, or the Z axis) among the plurality of coordinate axes forming the coordinate space S of the map 30' is set as the direction along the traveling direction C.

The area G in the map 30' is an area of each rectangular parallelepiped body obtained by dividing the map 30' into a plurality of the rectangular parallelepiped bodies along the three coordinate axes of the coordinate space S. Thus, sides of each of the areas G are configured using mutually crossing straight lines which are parallel to the three coordinate axes of the coordinate space S, respectively.

Further, the processor 20A may perform each of approximation of the specified shape area 40, rotation of the map 30', and collision determination in the same manner as described above even in the case of using the map 30'.

Figure 14:
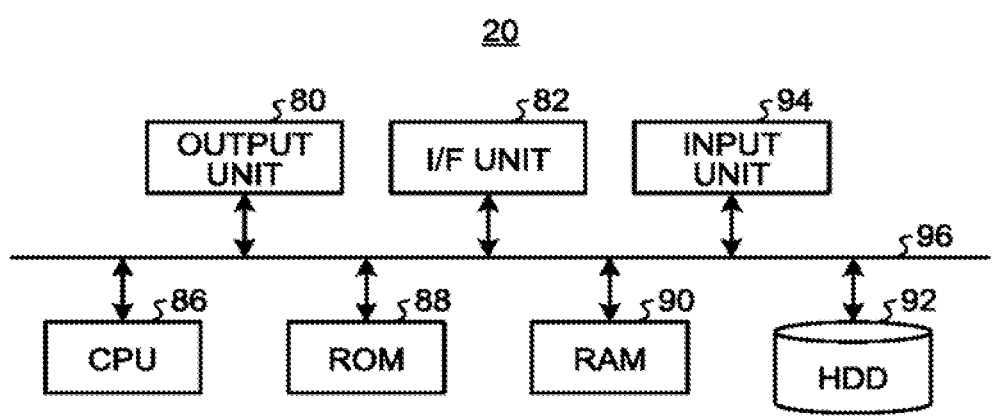
FIG. 14 is a hardware configuration diagram.

Next, an example of a hardware configuration of the information processing device 20 according to the above-described embodiment will be described. FIG. 14 is an example of a hardware configuration diagram of the information processing device 20 according to the above-described embodiment.

The information processing device 20 according to the above-described embodiment includes a control device such as a CPU 86, a storage device such as a read only memory (ROM) 88, a random access memory (RAM) 90, and a hard disk drive (HDD) 92, an I/F unit 82 which is an interface with various devices, an output unit 80 which outputs various kinds of information such as output information, an input unit 94 which receives operation by a user, and a bus 96 which connects the respective units, and has the hardware configuration that utilizes a general computer.

In the information processing device 20 according to the above-described embodiment, the CPU 86 reads a program from the ROM 88 onto the RAM 90 and executes the program so that the above-described respective units are implemented on the computer.

The program configured to execute the above-described respective processes executed by the information processing device 20 according to the above-described embodiment may be stored in the HDD 92. In addition, the program configured to execute the above-described respective processes executed by the information processing device 20 according to the above-described embodiment may be provided in the state of being incorporated in the ROM 88 in advance.

In addition, the program configured to execute the above-described processes executed by the information processing device 20 according to the above-described embodiment may be stored, as a file in an installable format or an executable format, in a computer-readable storage medium such as a CD-ROM, a CD-R, a memory card, a digital versatile disk (DVD), and a flexible disk (FD) and provided as a computer program product. In addition, the program configured to execute the above-described processes executed by the information processing device 20 according to the above-described embodiment may be stored in a computer connected to a network such as the Internet and provided through download vis the network. In addition, the program configured to execute the above-described processes executed by the information processing device 20 according to the above-described embodiment may be provided or distributed via the network such as the Internet.

Each function of the described embodiment may be implemented by one or more processing circuits or processing circuitry such as the processor described above.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising:
a memory; and
processing circuitry configured to:
acquire a movement route of a moving object,
identify a traveling direction of the moving object,
acquire a map defining a target to be subjected to collision determination with respect to the moving object in a coordinate space, the coordinate space having coordinate axes, one of which extending in the identified traveling direction, the movement route being arranged in the map, the target being a representation of a physical object in a physical space,
set a specified shape area on the map by approximating the movement route, the specified shape area having a shape along the movement route and along the coordinate axis extending in the identified traveling direction in the coordinate space of the map,
execute collision determination by determining whether the target is present at a present time in the specified shape area on the map,
output first collision determination result information indicating that there is a possibility of collision with the target, in response to determining that the target is present at the present time in the specified shape area,
output second collision determination result information indicating that there is no possibility of collision with the target, in response to determining that the target is not present at the present time in the specified shape area,
control a power unit of the moving object based on the first collision determination result information or the second collision determination result information, and perform approximation of the specified shape area for each route area between inflection points adjacent in the movement route, the inflection points being points in a curved area in the movement route that have curvatures equal to or greater than a predetermined threshold.

2. The device according to claim 1, wherein the processing circuitry is further configured to: rotate the map such that one of the coordinate axes of the coordinate space is the direction along the identified traveling direction.

3. The device according to claim 2, wherein the processing circuitry is further configured to:
rotate the map such that one of the coordinate axes of the coordinate space becomes a direction along the identified traveling direction when the moving object travels in the route area in the movement route.

4. The device according to claim 1, wherein
the movement route is represented by a group of a plurality of route points arranged along the movement route, and
the processing circuitry is further configured to: approximate the specified shape area having a pair of the route points adjacent in the movement route as both ends in the identified traveling direction.

5. The device according to claim 4, wherein the processing circuitry is further configured to: interpolate a new route point between the pair of route points when a distance between the pair of adjacent route points is equal to or larger than a threshold.

6. The device according to claim 1, wherein the specified shape area has a rectangular shape.

7. The device according to claim 6, wherein the rectangular shape is represented by four sides parallel to the coordinate axes in the coordinate space.

8. The device according to claim 1, wherein a size of the specified shape area is equal to or smaller than a size of the target on the map.

9. The device according to claim 1, wherein a length of a line segment in a crossing direction of the specified shape area is equal to or smaller than a length of line segment in the crossing direction of the target, the crossing direction crossing a line segment in the identified traveling direction.

10. The device according to claim 1, wherein a length in a direction along the identified traveling direction of the specified shape area that overlaps a curved area having a curvature equal to or larger than the predetermined threshold in the movement route is smaller than a length in a direction along the identified traveling direction of the specified shape area that does not overlap the curved area in the movement route.

11. The device according to claim 1, wherein the processing circuitry is further configured to: determine presence or absence of the target in the specified shape area of components of the map along a coordinate axis in the coordinate space of the map.

12. The device according to claim 2, wherein the processing circuitry is further configured to: rotate the map such that one of the coordinate axes of the coordinate space is the direction along the identified traveling direction by sequentially performing coordinate transformation of the components of the map along the coordinate axis in the coordinate space of the map before being rotated.

13. The device according to claim 1, wherein the moving object includes the information processing device.

14. The device according to claim 1, wherein
the processing circuitry is further configured to:
display, on a display device of the moving object, a display screen in which the specified shape area is defined on the map.

15. The device according to claim 1, wherein
the direction along the identified traveling direction is a direction within an angular range of ±22.5 degrees or a direction within an angular range of ±10 degrees with respect to the identified traveling direction, or a direction that matches the identified traveling direction.

16. The device according to claim 1, wherein the specified shape area has a size in response to the target on the map.

17. An information processing method comprising:
acquiring a movement route of a moving object;
identifying a traveling direction of the moving object;
acquiring a map defining a target to be subjected to collision determination with respect to the moving object in a coordinate space, the coordinate space having coordinate axes, one of which extending in the identified traveling direction, the movement route being arranged in the map, the target being a representation of a physical object in a physical space;
setting a specified shape area on the map by approximating the movement route, the specified shape area having a shape along the movement route and along the coordinate axis extending in the identified traveling direction in the coordinate space of the map;
executing collision determination by determining whether the target is present at a present time in the specified shape area on the map;
outputting first collision determination result information indicating that there is a possibility of collision with the target, in response to determining that the target is present at the present time in the specified shape area;
outputting second collision determination result information indicating that there is no possibility of collision with the target, in response to determining that the target is not present at the present time in the specified shape area;
performing approximation of the specified shape area for each route area between inflection points adjacent in the movement route, the inflection points being points in a curved area in the movement route that have curvatures equal to or greater than a predetermined threshold; and
controlling a power unit of the moving object based on the first collision determination result information or the second collision determination result information.

18. A computer program product having a non-transitory computer-readable medium including programmed instructions thereon which cause a computer to:
acquire a movement route of a moving object;
identify a traveling direction of the moving object;
acquire a map defining a target to be subjected to collision determination with respect to the moving object in a coordinate space, the coordinate space having coordinate axes, one of which extending in the identified traveling direction, the movement route being arranged in the map, the target being a representation of a physical object in a physical space;
set a specified shape area on the map by approximating the movement route, the specified shape area having a shape along the movement route and along the coordinate axis extending in the identified traveling direction in the coordinate space of the map;
execute collision determination by determining whether the target is present at a present time in the specified shape area on the map;

output first collision determination result information indicating that there is a possibility of collision with the target, in response to determining that the target is present at the present time in the specified shape area;

output second collision determination result information indicating that there is no possibility of collision with the target, in response to determining that the target is not present at the present time in the specified shape area;

perform approximation of the specified shape area for each route area between inflection points adjacent in the movement route, the inflection points being points in a curved area in the movement route that have curvatures equal to or greater than a predetermined threshold; and control a power unit of the moving object based on the first collision determination result information or the second collision determination result information.

* * * * *